United States Patent [19]

Miyabayashi

[11] Patent Number: 4,970,559
[45] Date of Patent: Nov. 13, 1990

[54] ORGANIC POLYMER MATERIAL HAVING ANTISTATIC PROPERTY, ELASTIC REVOLUTION BODY AND FIXING DEVICE USING THE SAME

[75] Inventor: Toshiyuki Miyabayashi, Tokyo, Japan

[73] Assignee: Canon Kabushiki Kaisha, Tokyo, Japan

[21] Appl. No.: 268,986

[22] Filed: Nov. 9, 1988

[30] Foreign Application Priority Data

Nov. 10, 1987 [JP] Japan ............................. 62-284562
Jun. 6, 1988 [JP] Japan ............................. 63-137347
Jun. 6, 1988 [JP] Japan ............................. 63-137348

[51] Int. Cl.$^5$ ............................................. G03G 15/20
[52] U.S. Cl. .................................. 355/290; 355/285; 118/60; 219/469
[58] Field of Search .............. 355/282, 285, 290, 295; 219/216, 469; 118/60, 114, 116; 430/98, 99, 124; 523/210, 212, 213; 29/132

[56] References Cited

U.S. PATENT DOCUMENTS

| | | | |
|---|---|---|---|
| 4,360,610 | 11/1982 | Murray et al. | 523/210 X |
| 4,529,752 | 7/1985 | Bluestein | 523/212 X |
| 4,596,920 | 6/1986 | Inagaki | 355/290 X |
| 4,632,855 | 12/1986 | Conlow et al. | 29/132 X |
| 4,653,897 | 3/1987 | Fromm | 355/290 |
| 4,727,394 | 2/1988 | Bov, Jr. et al. | 355/290 |
| 4,758,611 | 7/1988 | Beers | 523/212 |
| 4,810,564 | 3/1989 | Takahashi et al. | 355/290 X |

Primary Examiner—Arthur C. Prescott
Attorney, Agent, or Firm—Fitzpatrick, Cella, Harper & Scinto

[57] ABSTRACT

There are provided an organic polymer composition having an antistatic property, and a molding product and a fixing device using the same. The organic polymer composition comprises at least an organic polymer and porous inorganic fine powder carrying a liquid antistatic agent dispersed in the organic polymer; the porous inorganic fine powder having an oil absorption of 100 ml/100 g or larger before it carries the liquid antistatic agent.

25 Claims, 6 Drawing Sheets

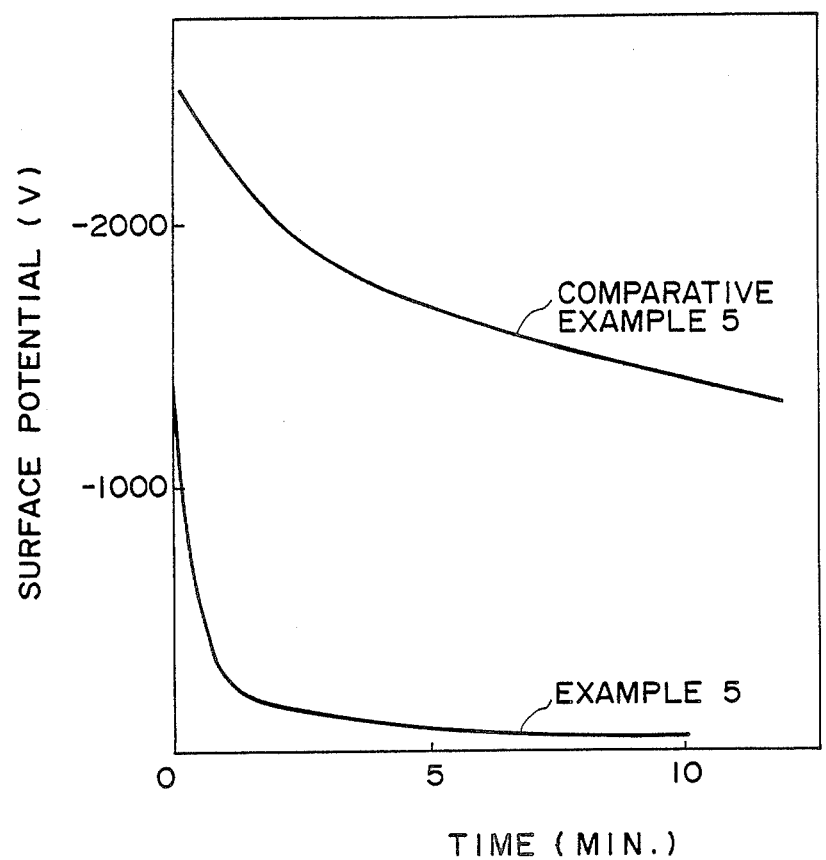
F I G. 3

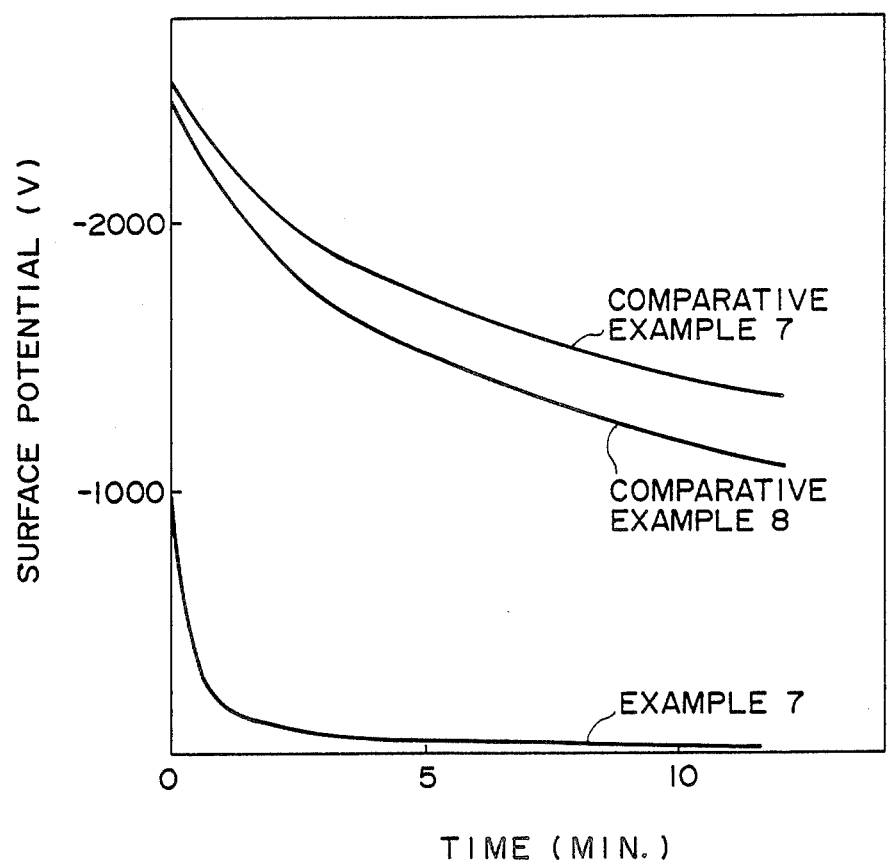
F I G. 4

ORGANIC POLYMER MATERIAL HAVING ANTISTATIC PROPERTY, ELASTIC REVOLUTION BODY AND FIXING DEVICE USING THE SAME

FIELD OF THE INVENTION AND RELATED ART

The present invention relates to an organic polymer material having an effect in preventing or suppressing electrification.

Further, the present invention relates to a specific silicone rubber composition, a molding product formed from the composition, an elastic revolution body (or body of revolution) comprising an elastic body which has a surface layer formed from the composition, and a fixing device including the revolution body.

Hitherto, in order to reduce electrical charges in various molding products of plastic or rubber, antistatic agents have been directly applied onto the surface of a polymer material or kneaded therein. However, in a process wherein the antistatic agent is directly applied onto the polymer material surface, the antistatic agent easily drops out of the surface and the effect thereof decreases in a very short time. On the other hand, in a process wherein the antistatic agent is kneaded in the polymer material, the effect thereof continues for a longer period than in the case of the application method, but the continuance is not sufficient. Further, in the kneading method, there occur problems of compatibility of the antistatic agent with the polymer material, and reduction in the physical property of the base material due to the kneading of the antistatic agent. For example, the mechanical characteristic of the base material decreases.

On the other hand, in the rubber products such as rubber roller, gearing belt, conveyer belt, rubber plate, and gasket, which are used in various devices such as electrophotographic copying machine, printer, office printing press, paper-making machine, and fibermaking machine, there sometimes occurs a problem of an obstacle caused by static electricity. Particularly, in an image forming apparatus such as electrophotographic copying machine, conveying ability, releasability and durability are generally required for the conveyer roller for conveying a sheet transfer material (or recording medium) such as plain paper along a prescribed covering path. Further, conveying ability, releasability, abrasion resistance, fixing characteristics and durability are also required under severe conditions with respect to a fixing device comprising a fixing roller and a pressure roller, which applies heat to an unfixed tone image formed on a transfer paper under pressure, and must convey the transfer paper to the prescribed conveying path while preventing an offset phenomenon due to sintering or melted toner.

Conventionally, the fixing device of this type comprises at least a fixing roller and a pressure roller which contact the fixing roller under pressure and rotates corresponding to the rotation thereof. The fixing roller comprises a hollow core bar (or cylinder) formed of a metal such as aluminum and iron, and a layer of a material having good releasability such as silicone rubber and fluorine-containing resin including polytetrafluoroethylene (PTFE), tetrafluoroethylenefluoroalkoxyethylene copolymer (PFA), etc., which covers the core bar. Inside the fixing roller, a heater such as a halogen lamp is disposed as desired, thereby to elevate the surface temperature of the fixing roller to a temperature suitable for the fixing. In many cases, the above-mentioned surface temperature of the fixing roller is controlled by means of a sensor so that it is set to a prescribed temperature. Further, around the peripheral surface of the fixing roller, there is sometimes disposed a cleaner for removing the offset toner and paper dust, or a separation claw for preventing an image-supporting material such as transfer paper from winding about the fixing roller.

On the other hand, the pressure roller comprises a core bar formed of a metal such as iron and stainless steel, and an elastic layer having releasability and comprising a material such as silicone rubber, which covers the core bar. The pressure roller is caused to contact the fixing roller under pressure by a pressure-applying means such as a spring.

The image-supporting material carrying thereon an unfixed toner image is sandwiched between and conveyed by the above-mentioned fixing roller and pressure roller under pressure, whereby the unfixed toner image is fixed to the image-supporting material under heating and pressure. However, in the conventional fixing device, the pressure roller is charged so as to have a high voltage (e.g., 2 KV or higher) because of triboelectrification when the paper is passed through the device, whereby there occurs a problem such that the paper winds about the pressure roller. Further, there is posed a problem that unfixed toner particles are scattered by the electric field due to the pressure roller to blur line images, or that the toner is attached to the fixing roller surface to often cause the offset phenomenon.

In the prior art, in order to solve the abovementioned problems, a discharge brush is caused to contact the pressure roller thereby to discharge it by using the earthing. However, the potential of the pressure roller is only decreased to about 1–2KV, whereby the discharge effect is limited and is insufficient.

In the case of a fixing device without cleaning means for cleaning the fixing roller surface, the amount of toner particles attached to the fixing roller surface is increased when the surface is considerably charged, whereby there is liable to occur a problem of image failure such as the offset, or of staining of the roller surface due to toner particle attached thereto.

In a fixing device using a roller under heating and pressure, it has been found that when there is used a pressure roller having a surface layer comprising a silicone rubber composition obtained by adding a surfactant such as fluorine-containing surfactant to a silicone rubber, the charging of the pressure roller is suppressed and therefore the amount of the toner attached to the fixing roller surface is remarkably reduced. Further, it has been found that there is an improvement in image failure such as the offset or in staining of the pressure roller due to toner particles attached thereto.

With respect to the above-mentioned fixing roller and/or pressure roller in the electrophotographic copying machine which is used under the hightemperature condition as described above and for which the continuance of the antistatic effect is required for a long period, the continuance of the antistatic effect is insufficient even when the antistatic agent is kneaded in the rollers.

In the conventional method wherein the antistatic agent is mixed in a rubber, there occurs a problem that the antistatic agent affects the mechanical property or another performance of the rubber. In order to enhance the antistatic effect, an electroconductive substance such as metal powder, metal oxide powder and carbon black has been mixed in a rubber. However, when such rubber material containing the conductive substance is used for the fixing roller or pressure roller in the electrophotographic copying machine, the surface energy of the roller surface is extremely increased and the releasability thereof is decreased in proportion to the addition amount of the conductive substance, whereby the staining of the roller surface due to toner particles attached thereto is increased.

Japanese Laid-Open Patent Application (JP-A, KOKAI) has proposed a process wherein synthetic porous zeolite fine powder (i.e. "molecular sieves") having 20-50 wt. % of a higher alcohol-type surfactant and an antistatic agent such as a polyether-modified silicone oil is used in order to solve the problem of winding of paper about the heat roller due to static electricity, which is encountered in the fixing device of a dry-type copying machine. However, because the oil absorption of the molecular sieves is substantially none or is very small (20 ml/100g or less), the amount of the antistatic agent contained in the molecular sieves is very small. Therefore, in order to obtain sufficient antistatic effect by using the molecular sieves impregnated with a small amount of the antistatic agent, the addition amount of the molecular sieves must be increased, whereby the physical properties of the base material, such as strength, hardness, elasticity, permanent deformation, releasability and heat resistance are affected by the molecular sieves, as the antistatic agent-carrying material. Even when a large amount of the antistatic agent is carried on the molecular sieves, the interior portions of the molecular sieves are not impregnated with the antistatic agent and the resultant mixture becomes a paste-like material. Accordingly, in such case, there is only expected the same persistence as in the case where the antistatic agent per se is simply added to a rubber and kneaded therein.

In order to prevent a rubber surface from staining, there has been proposed a method wherein a fluorine-containing polysiloxane having a functional group capable of reacting with an unvulcanized rubber, and a polyfluoroalkyl group in its side chain is mixed in a rubber (Japanese Laid-Open Patent Application No. 236842/1987. When such method is used, the roller surface can be prevented from staining in a relatively initial stage, but it is difficult to prevent the roller surface from staining for a long period.

Further, in a case where an elastic revolution body covered with the above-mentioned silicone rubber elastomer containing the fluorine-containing polysiloxane is used as a pressure roller, as compared with in the case of the conventional revolution body covered with dimethylsilicone rubber, the pressure roller is charged so as to have a higher voltage (e.g., 3 KV or higher) because of triboelectrification when the paper is passed through the fixing device. As a result, there remarkably occur problems that unfixed toner particles are scattered by the electric field due to the pressure roller to blur line images, that the toner is attached to the fixing roller surface to often cause the offset phenomenon, and that the paper winds about the roller, as compared with in the case where the conventional revolution body covered with dimethylsilicone rubber is used as the pressure roller. As described above, in the case of a fixing device without cleaning means for cleaning the fixing roller surface, the amount of toner particle attached to the fixing roller surface is increased when the surface is considerably charged, whereby there is liable to occur a problem of image failure such as offset, or of staining of the roller surface due to toner particle attached thereto These problems are more remarkably posed in a case where the elastic revolution body covered with the above-mentioned silicone rubber elastomer containing the fluorine-containing polysiloxane is used as a pressure roller, as compared with in the case of the conventional revolution body covered with the dimethylsilicone rubber.

SUMMARY OF THE INVENTION

An object of the present invention is to provide an organic polymer material which has an antistatic property and is excellent in persistence in antistatic effect.

Another object of the present invention is to provide an organic polymer material which has an antistatic property and is excellent in discharging effect.

A further object of the present invention is to provide an organic polymer material which has an antistatic property and contains an antistatic agent at a high concentration.

A further object of the present invention is to provide an organic polymer material which has an antistatic property and is excellent in mechanical strength.

A further object of the present invention is to provide an addition reaction-type silicone rubber composition excellent in antistatic effect.

A further object of the present invention is to provide an addition reaction-type silicone rubber composition excellent in discharging effect.

A further object of the present invention is to provide an addition reaction-type silicone rubber composition having a low surface energy.

A further object of the present invention is to provide a silicone rubber composition such as an addition reaction-type silicone rubber composition which contains a surfactant at a high concentration and is excellent in mechanical strength.

A further object of the present invention is to provide an elastic revolution body excellent in antistatic effect.

A further object of the present invention is to provide an elastic revolution body excellent in discharging effect.

A further object of the present invention is to provide an elastic revolution body of which surface is less liable to be contaminated.

A further object of the present invention is to provide an elastic revolution body excellent in durability.

A further object of the present invention is to provide a fixing device excellent in anti-offset characteristics.

A further object of the present invention is to provide a fixing device excellent in durability.

According to the present invention, there is provided an organic polymer composition having an antistatic property, comprising at least an organic polymer and porous inorganic fine powder carrying a liquid antistatic agent; the porous inorganic fine powder being dispersed in the organic polymer; the porous inorganic fine powder having an oil absorption of 100 ml/100 g or larger before it carries the liquid antistatic agent.

The present invention further provides a silicone rubber composition comprising a silicone rubber and porous inorganic fine powder carrying a polyether-modified silicone oil having a polyoxyalkylene group in its side chain; wherein the porous inorganic fine powder is dispersed in the silicone rubber and has an oil absorption of 100 ml/100 g or larger before it carries the polyether-modified silicone oil.

The present invention further provides a silicone rubber composition comprising an unvulcanized silicone rubber; a fluorine-containing polysiloxane having in its side chain a polyfluoroalkyl group, and a function group having a reactivity to the unvulcanized silicone rubber; and porous inorganic fine powder carrying a liquid antistatic agent; wherein the porous inorganic fine powder has an oil absorption of 100 ml/100 g or larger before it carries the liquid antistatic agent.

The present invention further provides a silicone rubber composition comprising an addition reaction-type silicone rubber and porous inorganic fine powder carrying a surfactant; wherein the porous inorganic fine powder is dispersed in the addition reaction-type silicone rubber and has an oil absorption of 100 ml/100 g or larger before it carries the surfactant.

The present invention further provides a molding product which is obtained by thermally molding the above-mentioned organic polymer composition or silicone rubber composition.

The present invention further provides an elastic revolution body with an elastic body which has a surface layer formed from the above-mentioned organic polymer composition or silicone rubber composition.

The present invention further provides a fixing device, comprising at least a pair of rollers between which a toner image-supporting material carrying an unfixed toner image is passed under heating and pressure to fix the toner image to the toner imagesupporting material; wherein at least one of the pair of rollers includes a surface layer comprising an elastomer which is formed from the above-mentioned organic polymer composition or silicone rubber composition.

According to my experiment, it has been found that when a silicone rubber of addition reaction type is used as the silicone rubber for a roller, the addition of a surfactant affects the curing (or hardening) reaction of the addition reaction-type silicone rubber.

The addition reaction-type silicone rubber is generally prepared from a "liquid A" comprising at least a base polymer of liquid vinyl group-containing diorganopolysiloxane

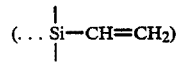

and a platinum catalyst as a catalyst for curing reaction; and a "liquid B" comprising at least an active hydrogen-containing siloxane

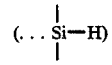

as a crosslinking or curing agent and a liquid vinyl groupcontaining diorganopolysiloxane. In the preparation, the above-mentioned liquid A and liquid B are mixed at a prescribed ratio (e.g., a ratio of 1:1), and the resultant mixture is degassed and then heated to be cured. The thus obtained addition reaction-type silicone rubber is solid and has elasticity because of its cross-linked structure.

According to my experiment, when various amounts of the fluorine-containing surfactant were added to the above-mentioned liquid A or liquid B, respectively, the curing is inhibited in an amount of 0.4 wt. % or more, and particularly, the curing failure was remarkable in an amount of 1 wt. % or more. Even in the addition amount wherein the curing failure is a little, there was observed a decrease in the physical property such as hardness, strength, resilience, and compression permanent deformation, with respect to the resultant addition reaction-type silicone rubber. Further, when the liquids A and B to which the fluorine-containing surfactant had been added were left standing still for a long period, the liquid silicone rubber and the fluorine-containing surfactant were separated from each other, whereby there was posed a problem in the storage stability or shelf life thereof.

These and other objects, features and advantages of the present invention will become more apparent upon a consideration of the following description of the preferred embodiments of the present invention taken in conjunction with the accompanying drawings, wherein like reference numerals denote like parts.

BRIEF DESCRIPTION OF THE DRAWINGS

FIG. 3 is a graph showing changes in the surface potential of the silicone rubber surfaces of Example 5 and Comparative Example 5, with the elapse of time.

FIG. 4 is a graph showing changes in the surface potential of the silicone rubber surfaces of Example 7 and Comparative Examples 7 and 8, with the elapse of time.

DETAILED DESCRIPTION OF THE INVENTION

Figure 1:
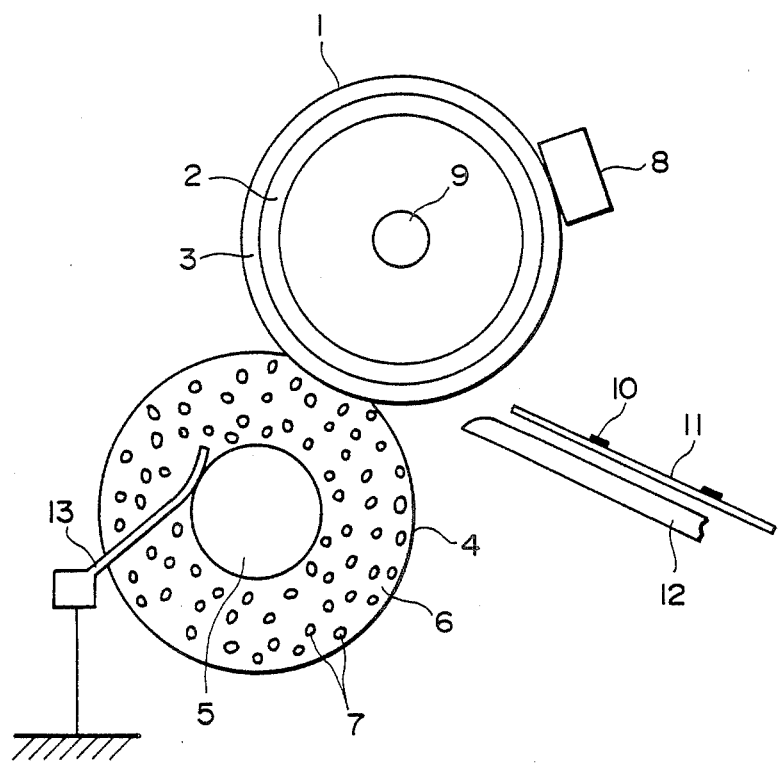
FIG. 1 is a schematic longitudinal sectional view of an embodiment of the roller fixing device using heat and/pressure according to the present invention.

The present invention relates to a polymer material used for forming a rubber or plastic molding, which has an excellent ability to prevent or suppress electrification. In the present invention, porous inorganic fine powder which carries a liquid antistatic agent capable of preventing or controlling electrification is mixed in an organic polymer compound such as plastic or rubber, thereby to obtain the abovementioned polymer material.

In a case where the polymer material according to the present invention is used for, e.g., the elastic coating layer of a roller such as fixing roller or pressure roller in an image-fixing device used in an image-forming apparatus such as electrophotographic copying machine, the electrification of the roller surface can be prevented or suppressed well. When the roller using the organic polymer material of the present invention is used, a failure in a fixed image that unfixed toner particles are scattered to blur line images is obviated, and the contamination of the roller surface with the toner attached thereto is prevented. Further, the problem of the winding of a sheet transfer material (or recording medium) such as paper about the roller and the problem of curl of the paper separated from the roller are solved.

Furthermore, in the present invention, the liquid antistatic agent which is capable of preventing or suppressing electrification and is carried on the porous inorganic fine powder having minute pores, is gradually emitted from the powder and supplied to a polymer material such as rubber, whereby good effect in preventing or suppressing electrification and good discharge effect are retained for a long period. As a result, the above-mentioned problems of the fixed image failure, the contamination of the roller surface with the toner attached thereto, the winding of sheet transfer material about the roller, and the curl of the paper separated therefrom can be obviated for a long time. As a result, the durability of the roller is remarkably enhanced.

In the present invention, even when an antistatic agent which is difficult or impossible to be mixed in the base rubber or plastic because of its compatibility with the rubber or plastic is used, it is possible to mix or disperse the antistatic agent in the base material by carrying it on the porous inorganic fine powder. When the antistatic agent is directly kneaded in a polymer material, the hardness elasticity, strength and compression permanent deformation of the material deteriorates. However, in the present invention, these physical properties are prevented from decreasing, because the porous inorganic fine powder carrying the antistatic agent is mixed or dispersed in the organic polymer compound.

In the present invention, the porous inorganic fine powder for carrying the antistatic agent has an oil absorption of 100 ml/100 g or more, and may preferably have an oil absorption of 200–800 ml/100 g, more preferably 300–600 ml/100 g. In order to prepare the porous inorganic fine powder carrying the antistatic agent, the fine powder may preferably be caused to carry and impregnated with the antistatic agent in an amount of not less than 50 ml (per 100 g of the fine powder) and less than the oil absorption of the fine powder. For example, not less than 50 ml and less than 500 ml of an antistatic agent may be carried on 100 g of porous inorganic fine powder having an oil absorption of 500 ml/100 g.

As described above, in the present invention, because the antistatic agent content in the addition amount of the above-mentioned fine powder is very high, not only effective antistatic ability can be obtained by adding a small amount of the above-mentioned fine powder, but also the bad effect of the porous inorganic fine powder on the base material (e.g., that in physical properties such as strength, hardness, elasticity and permanent deformation; and that in releasability and heat resistance) can be minimized.

In the present invention, the oil absorption of the porous inorganic fine powder may be measured according to the method described in JIS K 5105-1978 (pigment testing method).

More specifically, the oil absorption may be measured in the following manner.

1–5 g of a sample powder is disposed on a glass plate (about 250×250×5 mm), and boiled linseed oil is dropped from a burette little by little to the central portion of the sample powder, while sufficiently kneading the whole sample powder whenever a small portion of the linseed oil is dropped to the sample.

The above-mentioned operations of dropping and kneading are repeated until the whole sample is converted into a hard putty-like single mass for the first time, and the surface of the mass has gloss due to the linseed oil, i.e., the operation reaches the end point. The amount of the linseed oil used until the end point is measured, and the oil absorption G (%) is calculated according to the following formula:

$$G = H/S \times 100$$

H: the amount of the linseed oil (ml)
S: the mass (or weight) of the sample (g)

Incidentally, some species of powders cannot provide the above-mentioned surface gloss. When such powder is used as the sample, the end point may be defined as a point immediately before one such that the sample is abruptly softened due to the one drop of the boiled linseed oil, and adheres to the glass plate.

In the present invention, various surfactants or polyhydric alcohols may be used as the liquid antistatic agent capable of preventing or suppressing electrification. Among these, it is preferred to use a surfactant which has polar and non-polar groups in its molecule, and has both of hydrophobic and hydrophilic properties. As the liquid antistatic agent, there may preferably be used a polyether-modified silicone oil, or an amino-modified silicone oil.

The surfactant may be any of anionic surfactant, cationic surfactant, nonionic surfactant and ampholytic surfactant. Among these, the cationic surfactant or the nonionic surfactant is preferred in view of the antistatic ability.

Examples of the cationic surfactant may include: aliphatic amine salts, quaternary ammonium salts, and alkylpyridinium salts. Examples of the nonionic surfactant may include polyoxyethylene alkyl ethers, polyoxyethylene alkylphenol ethers, polyoxyethylene alkyl esters, sorbitan alkyl esters, and polyoxyethylene sorbitan alkyl esters.

In an image forming apparatus such as electrophotographic copying apparatus, a roller such as fixing roller and pressure roller used in a heat-and-pressure device for fixing an unfixed image onto an image-supporting member is generally used in a specific temperature range of 100° C. to 200° C. When the roller is used at a high temperature as mentioned above or is molded at a high temperature, the above-mentioned antistatic agent must have excellent heat resistance. Therefore, the antistatic agent may particularly preferably be a fluorine-containing surfactant, a polyether-modified silicone oil, or an amino-modified silicone oil.

Examples of the fluorine-containing surfactant may include: perfluoroalkylcarboxylic acid esters, perfluoroalkylsulfonic acid amide-type compounds, perfluoroalkylpolyoxyethyleneethanol, perfluoroalkylcarboxylic acid salts, perfluoroalkyl-ammonium salts, perfluoroalkyl-betaines, perfluoroalkylamine oxides, perfluoroalkylethylene oxide adducts, perfluoroalkyl phosphoric acid esters, non-dissociative perfluoroalkyl compounds. Among these fluorine-containing surfactants, a perfluoroalkylethylene oxide adduct or a perfluoroalkylcarboxylic acid salt is particularly preferred in view of the antistatic property and stability.

The polyether-modified silicone oil is a silicone oil having a nonionic surfactant structure wherein the dimethylpolysilaxane portion of the molecule corresponds to a hydrophobic group and the polyoxyalkylene portion corresponds to a hydrophilic group. The structure thereof may for example be represented by the following formula:

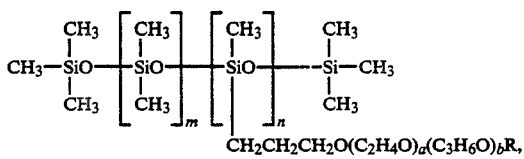

wherein R denotes hydrogen atom or an alkyl group; m denotes zero or a positive integer; n denotes a positive integer; and a and b respectively denote zero or a positive integer while a and b are not simultaneously zero.

The amino-modified silicone oil is a silicone oil having a cationic surfactant structure wherein the dimethylpolysiloxane portion of the molecule corresponds to a hydrophobic group and the $-NH_2$ or $-NH-$ group corresponds to a hydrophilic group. The structure thereof may for example be represented by the following formula:

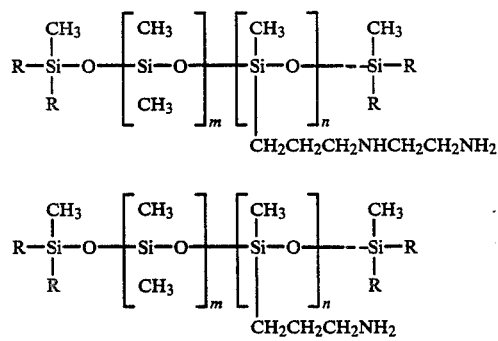

wherein R denotes $-CH_3$ or $-OCH_3$, and m denotes zero or positive integer, and n denotes a positive integer.

The porous inorganic fine powder used in the present invention may preferably be porous fine powder having good thermal stability, a large oil absorption, and minute pores. The porous inorganic fine powder may preferably have an average particle size of 1-70 microns, more preferably 1-40 microns. The porous inorganic fine powder has an oil absorption of 100 ml/100 g or more, and may preferably have an oil absorption of 200-800 ml/100 g, more preferably 300-600 ml/100 g.

The average particle size used herein may be determined by forming a photograph of the porous inorganic fine powder by means of an electron microscope, randomly measuring the particle sizes of about 50-100 particles of the photograph, and averaging the thus measured particle sizes.

Examples of the porous inorganic fine powder may include : gyrolite-type calcium silicate (e.g., trade name: Florite, mfd. by Tokuyama Soda K.K.); spherical porous silica (e.g., trade names: Syloid, mfd. by Fuji-Davison Kagaku K.K.; M.S. GEL mfd. by Dokai Kagaku K.K.; Silica Microbeads mfd. by Shokubai Kasei Kogyo K.K.); and Sirasu-balloon (spherical powder obtained from volcanic ash).

The porous inorganic fine powder may preferably be impregnated with a liquid antistatic agent in an amount of 50 ml or more (per 100 g of the fine powder) and less than the oil absorption.

If the above-mentioned impregnation amount exceeds the oil absorption, the surface of the fine powder may be wet with the liquid substance and may undesirably be converted into a paste state. On the other hand, the impregnation amount is smaller than 50 ml/100 g, it is difficult to obtain sufficient antistatic ability or sufficient persistence therein. When too large an amount of the porous inorganic fine powder is added to a polymer compound, it affects the mechanical property of the polymer compound. Particularly, the fine powder may preferably be impregnated with the antistatic agent in an amount near the oil absorption of the fine powder, in view of the performance thereof. For example, with respect to the gyrolite-type calcium silicate (Florite, mfd. by Tokuyama Soda K.K.) having an oil absorption of 500 500 ml/100 g), the impregnation amount may preferably be 50-500 ml, more preferably 200-490 ml, per 100 g of the Florite. Generally speaking, the antistatic agent may preferably be carried in an amount of 2/5 V to 4.9/5 V (ml) on 100 g of the porous inorganic fine powder having an oil absorption V (ml/100 g) which is 100 ml/100 g or larger.

In the present invention, there is no particular limitation with respect to the method for mixing the porous inorganic fine powder carrying the liquid antistatic agent, in the polymer compound such as rubber or plastic. Various methods can be adopted depending on the species or form of the rubber or plastic. For example, the antistatic agent may be kneaded in an unvulcanized rubber together with another additive. In order to effect the kneading, Banbury mixer rollers or an extruder may be used. With respect to a liquid rubber, stirring and mixing operation may be used by means of a stirrer.

In the present invention, the porous inorganic fine powder carrying the liquid antistatic agent having an antistatic ability may preferably be contained in an organic polymer compound in an amount of 0.01-10 wt. %, more preferably 0.1-5.0 wt. %, based on the weight of the organic polymer. The porous inorganic fine powder carrying the liquid antistatic agent can sufficiently show antistatic and discharging effects, even in a small amount.

The organic polymer compound may include rubber or plastic. Specific examples thereof may include: natural rubber, styrene-butadiene rubber, butadiene rubber, acrylonitrile-butadiene rubber nitrile rubber, chloroprene rubber, acrylic rubber, ethylene-propylene rubber, poly-isoprene rubber, butyl rubber, epichlorohydrin rubber, poly-urethane rubber, fluorinated rubber, and silicone rubber. These compounds can be used singly or in a blend of two or more species.

The silicone rubber generally includes a heatvulcanization (or curing) type which is converted into an elastomer under heating, and a room temperaturevulcanization type which is converted into an elastomer only when left standing at room temperature.

The heat-vulcanization silicone rubber may be prepared from an unvulcanized silicone rubber represented by the following formula:

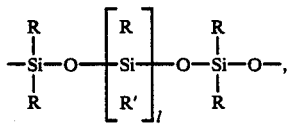

wherein R denotes a methyl group, R denotes a vinyl, phenyl or fluoroalkyl group, and l denotes an integer. More specifically, a vulcanizing (or curing) agent such as an organic peroxide is added to the unvulcanized silicone rubber, kneaded and then heated, thereby to prepare a vulcanized silicone rubber supplied with elasticity.

In the present invention, the porous inorganic fine powder carrying the antistatic agent may be mixed and dispersed in a coating material comprising a synthetic polymer to prepare a polymer material, which is then applied onto a plastic or rubber molding.

The above-mentioned coating material may be a synthetic polymer coating material which is generally used. Examples thereof may include : alkyd resin-type coating materials, aminoalkyd resin-type coating materials, vinyl resin-type coating materials, acrylic resin-type coating materials, epoxy resin-type coating materials, urethane resin-type coating materials, unsaturated polyester resin-type coating materials, and chlorinated rubber-type coating materials.

In the present invention, the method of mixing or dispersing the porous inorganic fine powder carrying the antistatic agent in the synthetic resin coating material is not particularly limited. However, it is preferred to effect such mixing or dispersing by means of a stirrer or triplet rollers. In view of persistence in the effect, it is preferred to disperse the porous inorganic fine powder carrying the antistatic agent in a molding, as compared with in a case where a coating material is applied onto the surface of the molding.

The rubber or plastic molding supplied with an antistatic ability which is obtained from the organic polymer material according to the present invention may be used in order to prevent electrification for various purposes. Examples thereof may include: rubber or plastic rollers used in paper-making, office printing, dyeing, fiber-making, and electrophotographic copying machine; gearing belts, conveyer belts, tires, rubber hoses and plastic pipes. Further, the organic polymer material of the present invention may also be used for preventing the staining of a molding due to floating dust, or for EMI molding (i.e., a molding capable of intercepting electromagnetic waves).

The molding or molded product according to the present invention may be prepared by charging the above-mentioned organic polymer composition in a mold and shaping it into a desired form. It is preferred to effect the molding process under heating. Further, such molding may preferably be effected under normal pressure or an increased pressure.

In a case where the organic polymer contained in the organic polymer composition comprises an addition reaction-type silicone rubber, the molding temperature may preferably be 60°-170° C., more preferably 110°-170° C. The addition reaction of the addition reaction-type silicone rubber occurs in the molding process under heating.

In a case where the organic polymer contained in the organic polymer composition comprises an unvulcanized silicone rubber, the molding temperature may preferably be 100°-200° C., more preferably 150-180° C. The unvulcanized silicone rubber is vulcanized by a vulcanizing agent to be cured or hardened. Examples of the vulcanizing agent may include: organic peroxides such as benzoyl peroxide, 2,4-dichlorobenzoyl peroxide, dicumyl peroxide, 2,5-dimethyl-2,5-di(tertiary-butylperoxy) hexane, pera-chlorobenzoyl peroxide, and di-tertiary-butyl peroxide.

In the present invention, there is not necessarily be clear the mechanism wherein the excellent antistatic performance is obtained and is retained for a long period when the porous inorganic fine powder carrying the liquid antistatic agent having an antistatic ability is added to and mixed in the rubber or plastic. However, it may be considered that the antistatic agent is uniformly dispersed in the rubber or plastic easily by causing the porous inorganic fine powder to carry thereon the liquid antistatic agent having antistatic ability, whereby excellent antistatic ability is obtained. Further, it may be considered that the antistatic agent carried on the porous inorganic fine powder is gradually emitted therefrom and moves to the surface of the material, whereby the antistatic ability is well retained.

In a case where the antistatic agent is directly added to a base material of rubber or plastic, the compatibility therebetween becomes a problem. However, in the present invention, it is not necessary to consider such compatibility. As a result, the addition amount may freely be selected as desired, and therefore the antistatic ability may easily be regulated.

Generally speaking, when an antistatic agent is directly added to a base material of rubber or plastic, the physical property and another performance are decreased in many cases. However, in the present invention, the antistatic ability is attained while preventing such decrease. The reason for this may be considered that the liquid antistatic agent is carried on the porous inorganic fine powder by impregnation and converted into a powder form, whereby phase separation does not occur.

The addition reaction-type silicone rubber composition according to the present invention comprises an addition reaction-type silicone rubber showing rubber-like elasticity, as a base, and porous inorganic fine powder carrying a surfactant. The addition reaction-type silicone rubber is prepared by reacting a vinyl group-containing organopolysiloxane with an active hydrogen group-containing siloxane under heating in the presence of a platinum-type catalyst thereby, to effect curing. The surfactant which is carried on the fine powder is added to the raw material liquid for the addition reaction-type silicone rubber. As a result, the inhibition effect of the surfactant on the crosslinking reaction is reduced even when it is added in a larger amount than in the prior art, and there can be prepared an addition reactiontype silicone rubber composition having a better physical property.

Further, in the present invention, a large amount of the surfactant contained in the composition is gradually supplied from the fine powder to the composition. Therefore, when the addition reactiontype silicone rubber composition is used for the elastic surface member of a roller, good antistatic and discharging effects may be retained for a long period, whereby the durability of the roller is remarkably improved.

The addition reaction-type silicone rubber, as the base material of the composition of the present invention may for example be prepared by reacting a organopolysiloxane containing a vinyl group as an unsaturated group represented by the following formula:

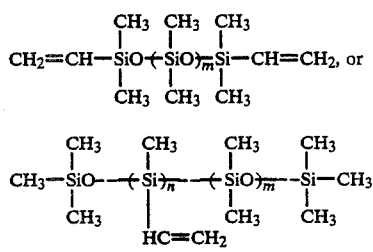

wherein m and n respectively denote as positive integer; with an active hydrogen group-containing siloxane having a reactive

group represented the following formula:

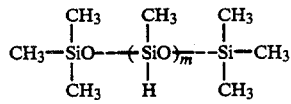

An addition reaction may be effected at a reaction temperature of 60°-170° C. in the presence of a platinum-type catalyst.

The surfactant used in combination with the addition reaction-type silicone rubber may preferably be a fluorine-containing surfactant as described above. Particularly, a perfluoro-ethylene oxide adduct is preferred because it little inhibits the curing and provides an excellent discharging effect.

The porous inorganic fine powder which is to be used for carrying the surfactant and to be mixed in the addition reaction-type silicone rubber is fine powder having an oil absorption of 100 ml/100 g or more, preferably 200-800 ml/100 g, more preferably 300-600 ml/100 g. The porous inorganic fine powder may preferably have particle sizes in the range of 5-70 microns, and may preferably have an average particle size of 10-40 microns. The fine pore size thereof may preferably be in the range of 0.01-30 microns, move preferably 0.01-10 microns.

The impregnation ratio of the surfactant such as fluorine-containing surfactant to the inorganic fine powder may preferably be 100-600 wt. parts, more preferably 400 - 500 wt. parts, per 100 wt. parts of the fine powder. The fine powder having minute pores impregnated with the surfactant may preferably be added to the silicone rubber composition so that the actual amount of the surfactant (i.e., the amount of the surfactant per se) added thereto is 0.1-10 wt. %, more preferably 0.5-5 wt. %, based on the silicone rubber.

A filler such as synthetic fine powder silica, quartz powder, fused quartz powder, diatomaceous earth or calcium carbonate may be added to the silicone rubber composition as desired. Example of another additive may include: heat-resistance improver such as iron oxide (e.g., red iron oxide); compression permanent deformation-improver such as titanium oxide, and zinc oxide; dispersing agent such as low-molecular weight siloxane; and anti-offset agent such as silicone oil.

The above-mentioned polyether-modified silicone oil having polyoxyalkylene group in its side chain may for example be one represented by the following formula:

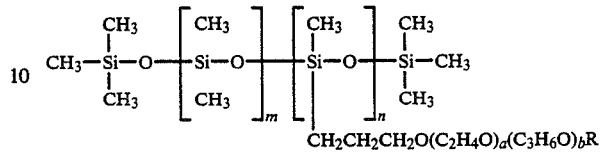

The fine powder to be used for carrying thereon the polyether-modified silicone oil is fine powder having an oil absorption of 100 ml/100 g or more, preferably 200-800 ml/100 g, more preferably 300-600 ml/100 g. The fine powder may preferably be porous inorganic fine powder having particle sizes in the range of 1-70 microns, and may preferably have an average particle size of 1-40 microns.

The impregnation ratio of the polyether-modified silicone oil to the fine powder may preferably be 100-600 wt. parts, more preferably 200-500 wt. parts, per 100 wt. parts of the fine powder. The porous fine powder having minute pores and carrying the polyether-modified silicone oil may preferably be added to the silicone rubber composition so that the actual amount of the polyether-modified silicone oil added thereto is 0.1-20 wt. %, more preferably 1.5-10 wt. %, particularly preferably 0.5-5 wt. %, based on the silicone rubber. If the addition amount is smaller than 0.1 wt. %, the charge-reducing effect is a little. On the other-hand, if the addition amount is larger than 20wt. % the physical property of the composition tends to decrease.

Further, the present invention also relates to a silicone rubber composition which comprises : an unvulcanized rubber; a fluorine-containing polysiloxane having, in its side chain, a polyfluoroalkyl group and a functional group having a reactivity to the unvulcanized rubber; and porous inorganic fine powder carrying a liquid antistatic agent.

The fluorine-containing polysiloxane may be a fluorine-containing compound, as described in Japanese Laid-Open Patent Application No. 236842/1987, which has a main chain comprising a polysiloxane skeleton, and has a polyfluoroalkyl group and a functional group having a reactivity to an unvulcanized rubber in its side chain, and is represented by the following general formula:

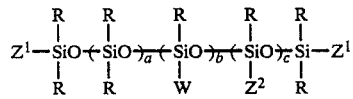

In the above formula, $Z^1$ and $Z^2$ respectively denote a functional group capable of reacting with the unvulcanized rubber such as —CH=CH$_2$, —OH, and —(CH$_2$)$_4$OH. R denotes an alkyl, alkenyl, or aryl group, or a group wherein a halogen atom such as chlorine, fluorine or bromine, or a cyano group can be substituted for one or more hydrogen atoms directly connected to the carbon atom of such hydrocarbon group. W may preferably be a polyfluoroalkyl group such as +CH$_2$+$_d$R$_f$, —O+CH$_2$+$_d$Rf, —O+OC$_3$F$_6$+$_e$R$_f$, —OCH$_2$+OC$_3$F$_6$+$_e$OC$_3$F$_7$, and —OCF$_2$+OC$_2$F$_4$+—

$OCF_2)_d$$OC_3F_7$. Further, d and f may preferably be an integer of 1-20, respectively, and e denotes an integer of 1-10. $R_f$ may preferably be a polyfluoroalkyl group having 3-21 carbon atoms in a straight or branched chain form, and a may preferably be an integer of 0-200, b may preferably be an integer of 1-100, and c may preferably be an integer of 0-50.

In the present invention, the fluorine-containing polysiloxane may preferably be added to the unvulcanized silicone rubber in an amount of 0.1-20 wt. parts, more preferably 1-10 wt. parts, per 100 wt. parts of the unvulcanized silicone rubber. If the addition amount is smaller than 0.1 wt. part, the surface energy of the rubber molding product little decreases. If the addition amount exceeds 20 wt. parts, the compatibility with the silicone rubber decreases.

The antistatic agent to be carried on inorganic fine powder in combination with the fluorine-containing polysiloxane, may be the above-mentioned surfactant or polyether-modified silicone oil. Further, the inorganic fine powder for carrying the antistatic agent, may preferably be the above-mentioned porous inorganic fine powder.

Further, in combination with the fluorine-containing polysiloxane, the inorganic fine powder carrying the antistatic agent may preferably be added to the silicone rubber composition so that the addition amount of the antistatic agent based on the silicone rubber is 0.5-5 wt. %.

The elastic revolution body (or body or revolution) according to the present invention comprises, as a surface layer, an elastomer formed from a silicone rubber composition containing porous inorganic fine powder carrying a liquid antistatic agent.

The fixing device according to the present invention is a device wherein an unfixed toner image formed on an image-supporting member is fixed under heating and pressure by sandwiching and passing the toner-supporting member between at least a pair of rollers. At least one of the pair of rollers is an elastic revolution body.

Hereinbelow, an embodiment of the elastic revolution body and the fixing device according to the present invention is described with reference to the accompanying drawings.

Figure 5:
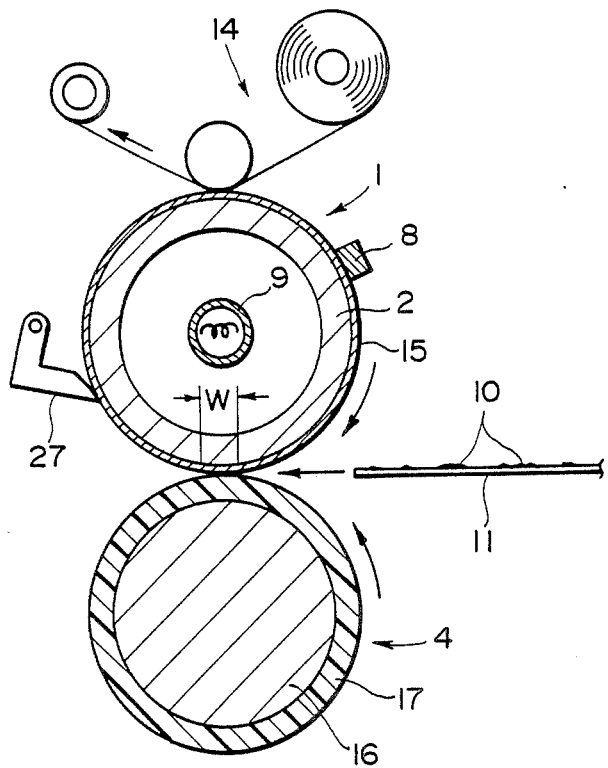
FIG. 5 is a schematic longitudinal sectional view of embodiment of the roller fixing device using heat and pressure according to the present invention.

FIGS. 1 and 5 are longitudinal schematic sectional views each showing an arrangement of the fixing device which has the elastic revolution body according to the present invention as a pressure roller.

Referring to FIGS. 1 and 5, the fixing device comprises a fixing roller 1 comprising a core bar 2 formed of a metal such as aluminum, iron and stainless steel; and a resin layer 3 formed on the outer surface of the core bar 2 comprising a resin having heat-resistance and releasability such as PFA or PTFE. Inside the care bar 2, a heating means 9 such as a heater is disposed.

Opposite to the fixing roller 1, a pressure roller 4 is caused to contact it under pressure by means of a pressing means (not shown) such as a spring so that it rotates corresponding to the rotation of the fixing roller 1. The pressure roller 4 comprises a care bar 5 formed of a metal such as iron and stainless steel, and an elastic layer 6 formed thereon which is formed from the polymer material (e.g., silicone rubber composition) according to the present invention. The elastic layer 6 contains inorganic fine powder 7.

Around the fixing roller 1, there may be disposed, as desired, a thermistor 8 for detecting the temperature of the fixing roller 1, or a cleaner (not shown) contacting the fixing roller 1 to clean the surface thereof. In FIG. 1, there is disposed an inlet guide 12 for introducing a toner-supporting material (or transfer material) 11 such as plain paper having thereon a toner image 10, between the fixing roller 1 and the pressure roller 4. On the other hand, a conductive flat spring 13 for earthing contacts the core bar 5 of the pressure roller 4.

The embodiment of the fixing device as shown in FIG. 5 is a little different from that shown in FIG. 1. Referring to FIG. 5, a fixing roller 1 comprises a core bar 2 and an elastic layer 15 formed on the surface thereof. Around the fixing roller 1, there are disposed a thermistor 8, an oil-applying device 14 and a separation claw 27. Inside the fixing roller 1, a heater 9 is disposed. The pressure roller 4 comprises a core bar 16 and a resin layer 17 formed thereon.

As described hereinabove, in the present invention, there does not occur the separation between a fluorine-containing surfactant and a liquid addition reaction-type silicone rubber composition, which is liable to occur when the fluorine-containing surfactant is simply added to the liquid silicone rubber composition, whereby the storage stability in the liquid state is remarkably enhanced. If the fluorine-containing surfactant is simply added to the liquid silicone rubber composition, curing failure thereof becomes marked as the addition amount of the surfactant increases. However, in the present invention, not only the curing characteristic is considerably improved, but also a large amount of the fluorine-containing surfactant can be added to the composition.

In the present invention, while attaining a discharging effect, there can be prevented a decrease in physical properties of hardness, strength, resilience and compression permanent deformation, which is liable to occur when the fluorine-containing surfactant is simply added to the liquid silicone rubber composition.

Further, when the composition of the present invention is used as a covering material of a heat-fixing roller, the electrification of the roller is prevented or reduced because of the antistatic and discharging effects of the composition, whereby the mount of an offset toner is remarkably decreased. Further, in combination with the low surface energy of the composition, staining of the roller surface due to the toner attachment can be none or substantially none. Moreover, the change in hardness and shape of the covering material is considerably reduced and the stability in physical property and size thereof is enhanced.

In the fixing device using a roller for fixing comprising the addition reaction-type silicone rubber composition as a covering material, various problems of paper curl, paper wrinkle, paper clogging, toner offset and staining due to toner attachment, in carrying and fixing, are solved, and not only sufficient durability but also excellent releasability and fixing property are retained.

Incidentally, in the present invention, either one or both of the rollers for fixing (i.e., a fixing roller and a pressure roller) may use the silicone rubber composition of the present invention as the covering material.

According to another aspect of the present invention, porous inorganic fine powder having minute pores and carrying a polyether-modified silicone oil which has a polyoxyalkylene group in its side chain is contained in a silicone rubber composition, whereby the electrification of a rubber molding can be prevented or suppressed.

According to another aspect of the present invention, the surface energy of a rubber molding is decreased and various properties can be retained by incorporating a fluorine-containing polysiloxane, which has a polyfluoroalkyl group and a functional group capable of reacting with an unvulcanized rubber in its side chain, into a silicone rubber composition, and by fixing the polysiloxane therein. In the present invention, the electrification of the rubber molding surface can be prevented or suppressed by incorporating porous inorganic fine powder carrying an antistatic agent such as a surfactant, in the composition. Further, the swelling of the rubber molding with the silicone oil can be prevented or suppressed.

When the composition of the present invention is used as the surface elastic layer of fixing roller or pressure roller used in a fixing device, e.g., for an image forming apparatus such as electrophotographic copying machine, the surface energy of the fixing roller surface is decreased and the electrification thereon can be suppressed, whereby the amount of a toner attached to the roller surface is remarkably reduced, and image failure such as offset or the staining of the roller surface due to the toner attachment can be prevented for a long period. As a result, the durability of the roller is considerably enhanced.

Further, in an image fixing device having a device for applying a silicone oil onto the roller surface, the swelling of the elastic surface layer with the oil can be prevented or suppressed, whereby the application oil can effectively be used and the staining of the roller surface due to the toner attachment can be prevented for a long time. Moreover, the roller deformation, swelling or peeling of the rubber layer due to the oil swelling are prevented, and therefore the roller durability is remarkably enhanced.

According to another aspect of the present invention, a liquid material is converted in a powder form by carrying it on porous inorganic fine powder by impregnation, whereby not only dispersion of the liquid material in rubber or plastic becomes easier but also uniform dispersion can be attained.

In the present invention, there can be prevented a decrease in physical property or another performance of a base material, which is liable to occur by mixing therein a liquid material having an antistatic property. Further, the antistatic liquid material carried on porous inorganic fine powder is gradually emitted therefrom and moves toward the surface of a base material, whereby persistence in its effect is remarkably enhanced. Moreover, the porous inorganic fine powder carrying the antistatic liquid material is uniformly dispersed in the base material, whereby the resultant antistatic ability is improved as compared with in the case of the direct addition of the antistatic agent.

EXAMPLE 1

There was prepared a liquid A (viscosity: 800 poises) which comprised 100 wt. parts of a vinyl groupcontaining diorganopolysiloxane, 5 wt. parts of dryprocess silica powder (Aerosil R972, mfd. by Nippon Aerosil K.K.), 20 wt. parts of quartz powder, 10 wt. parts of dimethylsilicone oil (viscosity: 1,000 cst (centistokes), SH-200, mfd. by Toray Silicone K.K.), 1 wt. parts of red iron oxide and a platinum-type catalyst.

Separately, there was prepared a liquid B (viscosity: 600 poises) which comprised 100 wt. parts of a mixture (comprising a vinyl group - containing diorganopolysiloxane and an active hydrogen group-containing siloxane), 5 wt. parts of dry-process silica powder (Aerosil 972, mfd. by Nippon Aerosil K.K.), 20 wt. parts of quartz powder, 10 wt. parts of dimethylsilicone oil (viscosity: 1,000 cst, SH-200, mfd. by Toray Silicone K.K.) and 1 wt. parts of red iron oxide.

Separately, porous inorganic filler impregnated with a fluorine-containing surfactant was prepared in the following manner.

100 wt. parts of gyrolite-type calcium silicate having an average particle size of 25 microns, fine pore sizes of 0.01–10 microns, an oil absorption of 500 ml/100 g, an apparent density of 0.1 and a BET specific surface area of 115 m$^2$/g (trade name: Florite, mfd. by Tokuyama Soda K.K.) as porous inorganic fine powder was introduced into a stirrer, and thereinto, 400 wt. parts of an acetone solution containing 70 wt. % of a fluorine-containing surfactant which comprised a perfluoroethylene oxide adduct (N-polyoxyethylene-N-alkyl-perfluorooctanesulfonic acid amide) as an antistatic agent was gradually dropped while stirring the calcium silicate fine powder. After the whole amount (i.e., 400 wt. parts) was dropped, the resultant mixture was taken out from the stirrer, and then air-dried at 50° C. for one hour, thereby to prepare calcium silicate fine powder impregnated with the surfactant. In the thus prepared fine powder, 100 g of the calcium silicate was impregnated with about 250 ml of the fluorine-containing surfactant.

1.4 wt. parts of the thus prepared calcium silicate fine powder impregnated with the perfluoroethylene oxide adduct (retaining about 1 wt. part of the perfluoroethylene oxide adduct) was added to 100 wt. parts of the above-prepared liquid A, and stirred to prepare a uniform dispersion (A-1).

Similarly, 1.4 wt. parts of the calcium silicate fine powder impregnated with the perfluoroethylene oxide adduct was added to 100 wt. parts of the above-prepared liquid B, and stirred to prepare a uniform dispersion (B-1).

Figure 2:
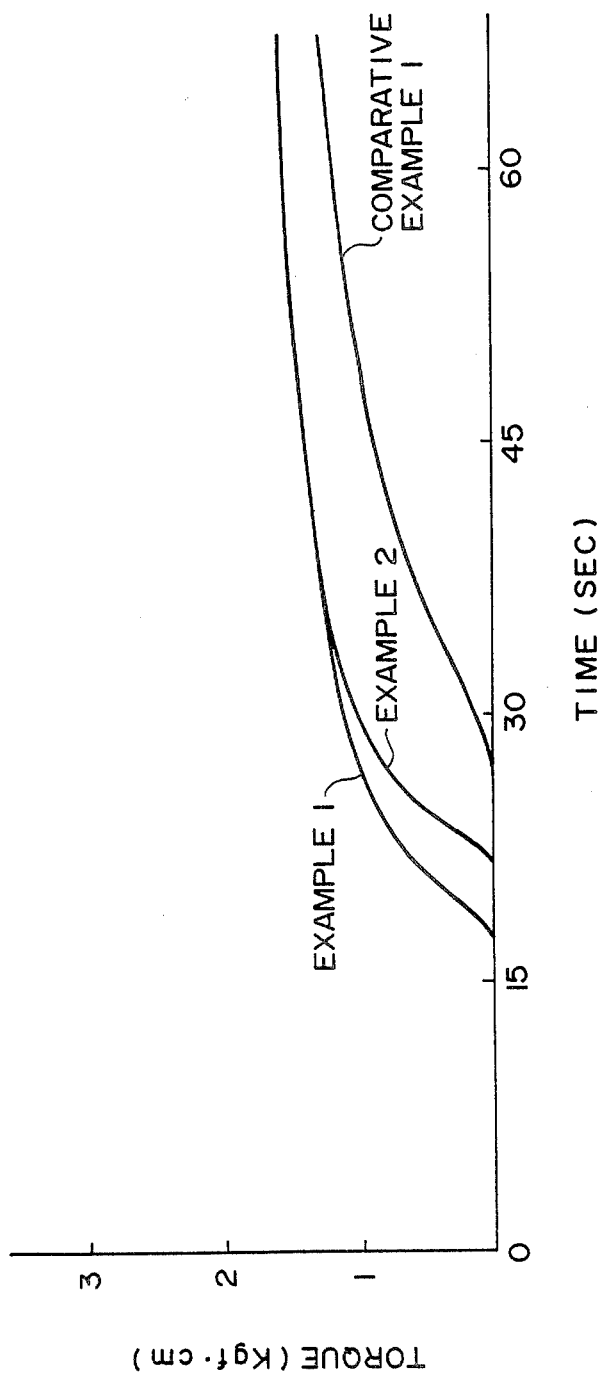
FIG. 2 is a graph showing changes in the curing state of the silicone rubber compositions of Examples 1 and 2, and Comparative Example 1, with the elapse of time.

The thus prepared dispersions (A-1) and (B-1) were mixed at a weight ratio of 1:1, ant subjected to a curing reaction by crosslinking at 130° C., thereby to prepare an addition reaction-type silicone rubber composition. The state of the progress of the curing reaction was observed by using a Curelasto Meter (Model JSR-III, mfd. by Orientec Co. Ltd.). The results are shown in FIG. 2.

Further, the shelf life of each of the dispersions (A-1) and (B-1) was examined. More specifically, a sample dispersion was charged in a polyethylene container equipped with a cap and left standing at 50° C. to examine the shelf life with respect to the separation of the surfactant. The results are shown in Table 1 appearing hereinafter.

EXAMPLE 2

Two species of dispersions (A-2) and (B-2) were prepared in the same manner as in Example 1 except that 4.0 wt. parts of the calcium silicate fine powder impregnated with the perfluoroethylene oxide adduct as the fluorine-containing surfactant (retaining about 3 wt. part of the perfluoroethylene oxide adduct) was added to 100 wt. parts of the liquids A and B prepared in Example 1, respectively.

The thus prepared liquids (A-2) and (B-2) were mixed at a weight ratio of 1:1, and subjected to a curing reaction at 130° C.

The state of the progress of the curing reaction was observed and the shelf life of each of the dispersions (A-2) and (B-2) was examined in the same manner as in Example 1. The results are shown in FIG. 2 and Table 1 appearing hereinafter, respectively.

COMPARATIVE EXAMPLE 1

Two species of dispersions (A 3) and (B-3) were prepared in the same manner as in Example 1 except that 1 wt. part of the fluorine-containing surfactant comprising the perfluoroethylene oxide adduct per se was added to 100 wt. parts of the liquids A and B prepared in Example 1, respectively.

The thus prepared liquids (A-3) and (B-3) were mixed at a weight ratio of 1:1, and subjected to a curing reaction at 130° C.

The state of the progress of the curing reaction was observed and the shelf life of each of the dispersions (A-2) and (B-2) was examined in the same manner as in Example 1. The results are shown in FIG. 2 and Table 1 appearing hereinafter, respectively.

TABLE 1

|  |  | 1 week | 1 month | 3 months | 6 months |
|---|---|---|---|---|---|
| Example 1 | Dispersion A-1 | No trouble | No trouble | No trouble | No trouble |
|  | Dispersion B-1 | No trouble | " | " | " |
| Example 2 | Dispersion A-2 | No trouble | " | " | " |
|  | Dispersion B-2 | No trouble | " | " | " |
| Comparative Example 1 | Dispersion A-3 | Surfactant was separated | — | — | — |
|  | Dispersion B-3 | Surfactant was separated | — | — | — |

As apparent from the graph of FIG. 2, in the preparation process for addition reaction-type silicone rubber composition according to the present invention, the inhibition of the curing was suppressed, as compared with in the case of that in Comparative Example 1 wherein the perfluoroethylene oxide adduct as the surfactant was directly added to the liquids A and B. Further, in the Compositions of Example 1 and 2, the curing inhibition was little even when the addition amount of the perfluoroethylene oxide adduct was increased. As apparent from Table 1, the storage stability of the dispersions (A-1), (A-2), (B-1) and (B-2) for preparing the addition reaction-type silicone rubber composition was remarkably enhanced as compared with that in the dispersions (A-3) and (B 3).

COMPARATIVE EXAMPLE 2

An addition reaction-type silicone rubber composition containing no perfluoroethylene oxide adduct was prepared in the same manner as in Example 1 except that the liquids A and B not containing the calcium silicate fine powder impregnated with the perfluoroethylene oxide adduct were mixed at a weight ratio of 1:1.

The physical properties of the thus prepared addition reaction-type silicone rubber composition are shown in the following Table 2 together with those obtained in Examples 1 and 2, and Comparative Example 1.

TABLE 2

|  | Ex. 1 | Ex. 2 | Com. Ex. 1 | Com. Ex. 2 |
|---|---|---|---|---|
| Hardness*1 (JIS A) | 15 | 15 | 11 | 16 |
| Resilience*1 (%) | 72 | 70 | 65 | 73 |
| Compression permanent deformation*2 (%)* | 10 | 10 | 20 | 7 |

*1There properties were measured according to JIS K 6301.
*2The compression permanent deformation was measured according to JIS C 2123 under the conditions of 180° C. and 22 hours.

As described above, the silicone rubber composition of Comparative Example 1 showed a decrease in physical properties, as compared with that of Comparative Example 2 containing no fluorine-containing surfactant. However, the silicone rubber compositions of Example 1 and 2 showed substantially no decrease in any of the physical properties of hardness, resilience and compression permanent deformation.

EXAMPLE 3

A pressure roller for a heat pressure fixing device having an elastic layer comprising the addition reaction-type silicone rubber composition according to the present invention was prepared in the following manner.

The dispersions (A-1) and (B-1 for preparing an addition reaction-type silicone rubber, which respectively contained calcium silicate fine powder so that the actual content of the fluorine containing surfactant was about 1 wt. %, were mixed at a weight ratio of 1:1 in the same manner as in Example 1, and then degassed to prepare a liquid mixture. The mixture was injected into a cylindrical metal mold in which a stainless steel core bar with ar outside diameter of 10 mm and a length of 23 cm coated with a vinyl siloxane-type primer had been disposed in advance and had preliminarily been heated up to 130° C., and kept at the same temperature for 3 min., thereby to cure the mixture. After the curing, the thus formed pressure roller covered with the silicone rubber was taken out from the metal mold. The pressure roller had an outside diameter of 16 mm and the silicone rubber covering layer had a thickness of 3 mm.

The thus obtained pressure roller was disposed in a heat fixing device as shown in FIG. 1, and a fixing test was conducted while sheets of paper were continuously passed through the fixing device. Referring to FIG. 1, the fixing roller 1 used herein was one comprising an aluminum core bar bar with an outside diameter of 20 mm and a 15 microns-thick tetrafluoroethylene resin layer covering the core bar.

<Fixing conditions>

Controlled temperature of fixing roller surface: 150° C.

Clamping pressure between fixing roller and pressure roller: 6 Kgf

Supplied paper: A-4 size transfer paper (plain paper) on which an unfixed toner image corresponding to a test pattern (ratio of the image portion area to the entire area: about 6 %) was formed.

Toner: Composition comprising 100 wt. parts of powder having a weight average particle size of about 11 microns obtained from 100 wt. parts of a styreneacrylic acid ester-type resin (weight-average molecular weight; about 250,000), 60 wt. parts of magnetic powder (average particle size of 0.3 microns), low-molecular weight polypropylene and 2 wt. parts of charge control agent (mono-azo-type metal complex) by melt-kneadingpulverization process; and 0.25 wt. part of hydrophobic dry-process silica (Aerosil R 972) externally added thereto.

Paper-supply speed: 4 sheets/min.

As a result, no staining of the pressure roller surface due to the attachment of the toner occurred and no attachment of the toner to the fixing roller surface was observed even after 100,000 sheets of paper were passed through the fixing device. In the test, image quality failure, image staining or image dropout was not observed and good image quality was retained. Further, no jamming trouble due to paper wrinkle, paper clogging, or paper curl occurred, and good conveying property was retained. Moreover, the deformation of the roller was little and the stability in size was good.

EXAMPLE 4

A pressure roller was prepared in the same manner as in Example 3 except that the dispersions (A-2) and (B-2) obtained in Example 2 were used. The thus obtained pressure roller had a good discharging property and good durability.

COMPARATIVE EXAMPLE 3

A pressure roller was prepared in the same manner as in Example 3 except that the dispersions (A-3) and (B-3) obtained in Comparative Example 1 were used. The thus obtained pressure roller was disposed in a fixing device as shown in FIG. 1 and subjected to a fixing test in the same manner as in (Example 3.

As a result, no problem occurred until paper passage of 50,000 sheets, but staining cf the pressure roller surface due to the attachment of the toner began to occur thereafter.

COMPARATIVE EXAMPLE 4

A pressure roller was prepared in the same manner as in Example 3 except that the liquids A and B containing no perfluoroethylene oxide adduct were used. The thus obtained pressure roller was disposed in a fixing device as shown in FIG. 1 and subjected to a fixing test in the same manner as an Example 3.

As a result, no problem occurred until paper passage of 10,000 sheets, but staining of the pressure roller surface due to the attachment of the toner began to occur thereafter.

EXAMPLE 5

Porous inorganic fine powder having minute pores and carrying a polyether-modified silicone oil having a polyoxyalkylene group in its side chain (KF 352, mfd. by Shinetsu Kagaku K.K.) was prepared in the following manner.

100 wt. parts of gyrolite-type calcium silicate having an average particle size of 25 microns, fine pore sizes of 0.01–10 microns, an oil absorption of 500 ml/100 g, an apparent density of 0.1 and a BET specific surface area of 115 $m^2/g$ (trade name: Florite, mfd. by Tokuyama Soda K.K.) as porous inorganic fine powder was introduced into a stirrer, and thereinto, 400 wt. parts of the polyether modified silicone oil was gradually dropped while stirring the calcium silicate fine powder. After the whole amount (i.e., 400 wt. parts) was dropped, the stirring was continued for sometime, and the resultant mixture was taken out from the stirrer thereby to prepare calcium silicate fine powder carrying the polyether-modified silicone oil. In the thus prepared fine powder, 100 g of the calcium silicate carried about 400 ml of the polyether-modified silicone oil.

Separately, there was prepared an addition reaction-type silicone rubber composition (viscosity: 900 poises) which comprised 100 wt. parts of a vinyl group-containing diorgano-polysiloxane, 5 wt. parts of dry-process silica powder (Aerosil R 972, mfd. by Nippon Aerosil K.K.), 20 wt. parts of quartz powder, 1 wt. parts of red iron oxide and a platinum-type catalyst.

Then, 5 wt. parts of the above-mentioned porous inorganic fine powder carrying the polyethermodified silicone oil was added to 100 wt. parts of the above-mentioned silicone rubber composition and uniformly stirred and dispersed to prepare an addition reaction-type silicone rubber composition (liquid A).

Separately, there was prepared a liquid B (viscosity: 600 poises) which comprised 100 wt. parts of a mixture (comprising a vinyl group-containing diorgano-polysiloxane and active hydrogen groupcontaining diorganopolysiloxane), 5 wt. parts of dryprocess silica powder (Aerosil R 972, mfd. by Nippon Aerosil K.K.), 20 wt. parts of quartz powder, and 1 wt. parts of red iron oxide.

Then, 5 wt. parts of the above-mentioned porous inorganic fine powder carrying the polyethermodified silicone oil was added to 100 wt. parts of the above-mentioned silicone rubber composition and uniformly stirred and dispersed in the same manner as in the case of the liquid A, to prepare an addition reaction-type silicone rubber composition (liquid B).

The liquids A and B prepared above were mixed at a weight ratio of 100:100, degassed and heated at 150° C. for 10 min. As a result, the vinyl groups and the hydrogen atoms connected to the silicon atoms contained in the composition initiated an addition reaction in the presence of the plalinum catalyst, whereby the mixture of the compositions was cured to provide a rubber-like elastic material.

COMPARATIVE EXAMPLE 5

A liquid addition reaction-type silicone rubber composition having a viscosity of 900 poises (liquid C) was prepared in the same manner as in the liquid A in Example 5 except that the porous inorganic fine powder carrying the polyether-modified silicone oil was not added thereto.

Separately, a liquid addition reaction-type silicone rubber composition having a viscosity of 600 poises (liquid D) was prepared in the same manner as in the liquid B in Example 5 except that the porous inorganic fine powder carrying the polyether-modified silicone oil was not added thereto.

The liquids C and D prepared above were mixed at a weight ratio of 100:100, degassed and heated at 150° C. for 10 min. As a result, the vinyl groups and the hydrogen atoms connected to the silicon atoms contained in the composition initiated an addition reaction in the presence of the plalinum catalyst, whereby the mixture of the compositions was cured to provide a rubber-like elastic material.

With respect to the rubbery materials obtained in Example 5 and Comparative Example 5, the antistatic and discharging effects thereof were examined in the following manner.

A voltage of $-5000$ V was applied to a sample rubber piece (20 mm $\times$ 60 mm $\times$ 2 mm) by corona discharge for a prescribed time (1 sec), and immediately thereafter the potential change on the surface of the sample rubber piece was measured by means of a surface electrometer by using a sensitive plate probe. the result are shown in FIG. 3.

EXAMPLE 6

A pressure roller for a heat pressure fixing device having an elastic layer comprising the silicone rubber composition according to the present invention was prepared in the following manner.

The silicone rubber compositions A and B obtained in Example 5 were uniformly mixed at a weight ratio of 100:100, and then degassed to prepare a liquid mixture. The mixture was injected into a cylindrical metal mold in which a stainless steel core bar with an outside diameter of 10 mm and a length of 24 cm coated with a siloxane-type primer had been disposed in advance and had preliminarily been heated up to 130° C., and kept at the same temperature for 10 min. thereby to cure the mixture. After the curing, the thus formed pressure roller covered with the silicone rubber was taken out from the metal mold. the pressure robber had an outside diameter of 16 mm and the silicone rubber covering layer had a thickness of 3 mm.

The thus obtained pressure roller was disposed in a heat fixing device as shown in FIG. 1, and a fixing test was conducted while sheets of paper were continuously passed through the fixing device. Referring to FIG. 1, the fixing roller 1 used herein was one comprising an aluminum core bar with an outside diameter of 20 mm and a 15 microns-thick tetrafluoroethylene resin layer covering the core bar.

<Fixing conditions>

Controlled temperature of fixing roller surface: 150° C.

Clamping pressure between fixing roller and pressure roller: 6 Kgf

Supplied paper: A-4 size transfer paper (plain paper) on which an unfixed toner image corresponding to a test pattern was formed.

Paper supply speed: 4 sheets/min.

As a result, no staining of the pressure roller surface due to the attachment of the toner occurred and no attachment of the toner to the fixing roller surface was observed even after 100,000 sheets of paper were passed through the fixing device. In the test, image quality failure, image staining or image dropout was not observed and good image quality and fixability were retained. Further, paper winding about the roller, paper wrinkle, paper clogging, or paper curl was not observed, no jamming trouble occurred, and good conveying property was retained. Moreover, the deformation of the roller was little and the stability in size was good.

COMPARATIVE EXAMPLE 6

A pressure roller was prepared in the same manner as in Example 6 except that the liquids C and D obtained in Comparative Example 5 were used. The thus obtained pressure roller was disposed in a fixing device as shown in FIG. 1 and subjected to a fixing test in the same manner as in Example 6.

As a result, staining of the pressure roller surface due to the attachment of the toner increased at the time of paper passage of 10,000 sheets, and image failure, image staining, image dropout, paper wrinkle, paper clogging and paper curl occurred.

EXAMPLE 7

Porous inorganic fine powder carrying a fluorine-containing surfactant was prepared in the following manner.

100 wt. parts of gyrolite-type calcium silicate having an average particle size of 25 microns, fine pore sizes of about 0.01–10 microns, an oil absorption of 500 ml / 100 g, an apparent density of 0.1 and BET specific surface area of 115 $m^2/g$ (trade name: Florite, mfd. by Tokuyama Soda K.K.) was introduced into a stirrer, and thereinto, 400 wt. parts of an acetone solution containing 70 wt. % of a fluorine-containing surfactant which comprised a perfluoroethylene oxide adduct (N-polyoxyethylene-Nalkyl-perfluorooctanesulfonic acid amide) was gradually dropped while stirring the calcium silicate fine powder. After the whole amount (i.e., 400 wt. parts) was dropped, the resultant mixture was taken out from the stirrer, and then air-dried at 50° C. for one hour, thereby to prepare calcium silicate fine powder carrying the surfactant. In the thus prepared fine powder, 100 g of the calcium silicate carried about 250 ml of the surfactant.

Separately, there was prepared a liquid addition reaction-type silicone rubber composition (viscosity: 900 poises) which comprised 100 wt. parts of a vinyl group-containing diorgano-polysiloxane; 5 wt. parts of dry-process silica powder, 20 wt. parts of quartz powder, 1 wt. parts of red iron oxide and a platinum-type catalyst.

To 100 parts of the liquid silicone rubber composition, 10 wt. parts of a fluorine-containing polysiloxane (molecular weight: 30,000, viscosity: 150 poises) which had polyfluoro-alkyl groups (about 6 groups per molecule) represented by $C_4F_9(CH_2)-_2$, and vinyl groups (4 groups per molecule) capable of reacting with an addition reaction-type silicone rubber; and 3 wt. parts of porous inorganic fine powder carrying the fluorine-containing surfactant which comprised the perfluoroethylene oxide adduct [N-polyoxyethylene-N-alkylperfluorooctanesulfonic acid amide,

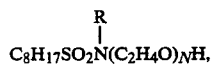

$(n=10)$] were added, uniformly stirred and dispersed to prepare a liquid addition reaction-type silicone rubber composition (liquid A).

Separately, there was prepared a liquid addition reaction-type silicone rubber composition, (viscosity: 600 poises) which comprised 100 wt. parts of a mixture (comprising a vinyl group-containing diorgano-polysiloxane and active hydrogen group-containing diorganopolysiloxane, 5 wt. parts of dryprocess silica powder, 20 wt. parts of quartz powder, and 1 wt. parts of red iron oxide.

Then 10 wt. parts of the above-mentioned fluorine-containing polysiloxane, and 3 wt. parts of the above-mentioned porous inorganic fine powder carrying the fluorine-containing surfactant were added to 100 wt. parts of the above-mentioned liquid silicone rubber composition and uniformly stirred and dispersed in the same manner as in the case of the liquid A, to prepare an addition reaction-type silicone rubber composition (liquid B).

The liquids A and B prepared above were mixed at a weight ratio of 100:100, degassed and heated at 150° C. for 10 min. As a result, the vinyl groups and the hydrogen atoms connected to the silicon atoms contained in the composition initiated an addition reaction in the presence of the platinum catalyst, whereby the mixture of the compositions was cured to provide a rubber-like elastic material.

COMPARATIVE EXAMPLE 7

A liquid addition reaction-type silicone rubber composition having a viscosity of 900 poises (liquid C) was prepared in the same manner as in the liquid A in Example 7 except that the fluorine-containing polysiloxane or the porous inorganic fine powder carrying the fluorine-containing surfactant was not added thereto.

Separately, a liquid addition reaction-type silicone rubber composition having a viscosity of 600 poises (liquid D) was prepared in the same manner as in the liquid B in Example 7 except that the fluorine-containing polysiloxane or the porous inorganic fine powder carrying the fluorine-containing surfactant was not added thereto.

The liquids C and D prepared above were uniformly mixed at a weight ratio of 100:100, degassed and heated at 150° C. for 10 min. As a result, the vinyl groups and the hydrogen atoms connected to the silicon atoms contained in the composition initiated an addition reaction in the presence of the platinum catalyst, whereby the mixture of the compositions was cured to provide a rubber-like elastic material.

COMPARATIVE EXAMPLE 8

A liquid addition reaction-type silicone rubber composition (liquid E) was prepared in the same manner as in the liquid A in Example 7 except that the porous inorganic fine powder carrying the fluorine-containing surfactant was not added thereto.

Separately, a liquid addition reaction-type silicone rubber composition (liquid F) was prepared in the same manner as in the liquid B in Example 7 except that the porous inorganic fine powder carrying the fluorine-containing surfactant was not added thereto.

The liquids E and F prepared above were uniformly mixed at a weight ratio of 100:100, degassed and heated at 150° C. for 10 min. As a result, the vinyl groups and the hydrogen atoms connected to the silicon atoms contained in the composition initiated an addition reaction in the presence of the platinum catalyst, whereby the mixture of the compositions was cured to provide a rubber-like elastic material.

With respect to the rubbery materials obtained in Example 7 and Comparative Example 7 and 8, toner-releasability, antistatic and discharging effects, silicone oil-resistance thereof were examined in the following manner.

50 circular toner images having a diameter of 2 mm and a thickness of 50 microns were formed on a sample rubber piece (20 mm×60 mm×2 mm), and the toner images were heat melted at an environmental temperature of 150° C. for 30 min., and then cooled to room temperature to be solidified. An adhesive type (Union-A, type, mfd. by Union Kogyo K.K.) was attached to the toner images, and along the tape, a rigid roller was reciprocated ten times, and then the tape was peeled.

The thus obtained peeling conditions of the toner images were classified into five classes, and the numbers of the toner images allotted to the classes were respectively measured and marked. The sums of the thus obtained marks were calculated and divided by the total marks to obtain percentages. The toner releasability was represented by the thus obtained percentage.

The peeling conditions of the toner images were classified in the following manner.

A: A state wherein the toner image was completely released (4 marks)

B: An intermediate state between the state A and the state C (3 marks)

C: A state wherein ½ of total area was released (2 marks)

D: An intermediate state between the state C and the state D (1 mark)

E: A state wherein the toner image completely remained (0 mark)

The toner releasability was calculated according to the following formula: Toner releasability $(\%) = 1/200 \times (4 \times a + 3 \times b + 2 \times C + 1 \times d + 0 \times e) \times 100$, wherein $a+b+c+d+e=50$.

The thus obtained results are shown in the following Table 3.

TABLE 3

|  | Ex. 7 | Com. Ex. 7 | Com. Ex. 8 |
| --- | --- | --- | --- |
| Toner releasability (%) | 90 | 40 | 80 |

The antistatic and discharging effects of the sample rubber piece were examined in the same manner as in Example 5. The results are shown in FIG. 4.

The silicone oil-resistance was determined in the following manner.

A sample rubber piece (20 mm×60 mm×2 mm) was soaked in a dimethylisilicone oil (viscosity: 100 cSt) kept at 180° C. for 50 hours, and the rate of change in the volume was measured. The results are shown in the following Table 4.

TABLE 4

|  | Ex. 7 | Com. Ex. 7 | Com. Ex. 8 |
| --- | --- | --- | --- |
| Rate of change in volume (%) | 5 | 50 | 15 |

EXAMPLE 8

A pressure roller was prepared in the same manner as in Example 6 except that the silicone rubber composition obtained in Example 7 was used. The thus obtained pressure roller was subjected to a fixing test in the same manner as in Example 6.

As a result, the thus obtained pressure roller had good releasability and a good fixing characteristic. More specifically, no staining of the pressure roller surface due to the attachment of the toner occurred and no attachment of the toner to the fixing roller surface was observed even after 100,000 sheets of paper were passed through the fixing device. In the test, image quality failure, image staining or image dropout was not observed and good image quality and fixability were retained. Particularly, no jamming trouble due to paper wrinkle, paper clogging, or paper curl occurred, and good conveying property was retained. Moreover, the deformation in the shape of the roller was little and the stability in size was good.

COMPARATIVE EXAMPLE 9

A pressure roller was prepared in the same manner as in Example 8 except that the liquid C and D obtained in Comparative Example 7 were used. The thus obtained pressure roller was subjected to a fixing test in the same manner as in Example 6.

As a result, staining of the pressure roller surface due to the attachment of the toner increased at the time of paper passage of 10,000 sheets, and image failure, image staining, image dropout, paper wrinkle, paper clogging and paper curl occurred.

COMPARATIVE EXAMPLE 10

A pressure roller was prepared in the same manner as in Example 8 except that the liquid E and F obtained in Comparative Example 8 were used. The thus obtained pressure roller was subjected to a fixing test in the same manner as in Example 6.

As a result, staining of the pressure roller surface due to the attachment of the toner increased at the time of paper passage of 20,000 sheets, and image failure, image staining, image dropout, paper wrinkle, paper clogging and paper curl occurred.

EXAMPLE 9

A fixing roller having an elastic layer was prepared in the following manner.

The liquid addition reaction-type compositions A and B obtained in Example 7 were uniformly mixed at a weight ratio of 100:100, and then degassed to prepare a liquid mixture. The mixture was injected into a metal mold in which an aluminum core cylinder (for heat fixing roller to be used in an electrophotographic copying machine) with an outside diameter of 60 mm coated with a siloxane-type primer had been disposed in advance, and had preliminarily been heated up to 150° C., and kept at the same temperature for 5 min. thereby to completely cure and shape the mixture. After the curing, the thus formed fixing roller covered with the silicone rubber was taken out from the metal mold. The silicone rubber covering layer (elastic layer) 15 of the fixing roller 1 had a thickness of 0.5 mm as shown in FIG. 5.

The thus obtained fixing roller was disposed in a heat-roller fixing device as shown in FIG. 5, and fixing test was conducted under the following fixing conditions while sheets of paper were continuously passed through the fixing device. Referring to FIG. 5, the fixing device comprised a separation claw 7, an oil-applying device 14, and a pressure roller 4 comprising a core bar 16 and a resin layer 17. The oil-applying device 14 was a web-type device equipped with a web (trade name: Normex Paper Web) impregnated with a dimethylsilicone oil having a viscosity of 10,000 cs at 25° C. (trade name: K96H, mfd. by Shinetsu Kagaku K.K.).

<Fixing conditions>

Controlled temperature of fixing roller surface: 175°–185° C.

Web supply speed: 1 m per passage of 10,000 sheets (A - 4 paper)

Supplied paper: A-4 size transfer paper on which an unified toner image corresponding to a test pattern was formed.

Paper supply speed: 50 sheets/min.

Nip width (W) between fixing roller 1 and pressure roller 4: 9 - 10 mm.

As a result, the fixing roller 1 retained good releasability even after 200,000 sheets of paper were passed through the fixing device, and practically problematic toner offset or jamming trouble due to the toner offset did not occur. Further, good image quality was retained, and the shape change in the roller or swelling of the rubber layer due to swelling with the silicone oil did not occur, whereby the durability (roller life) was very good.

PRODUCTION EXAMPLE 1

100 Wt. parts of gyrolite-type calcium silicate having an average particle size of 25 microns, fine pore sizes of about 0.01–10 microns, an oil absorption of 500 ml/100 g, an apparent density of 0.1 and a BET specific surface area of 115 $m^2/g$ (trade name: Florite, mfd. by Tokuyama Soda K.K.) was introduced into a stirrer, and thereinto, a fluorinecontaining surfactant (Eftop EF122B, mfd. by Mitsubishi Kinzoku K.K.) which comprised a perfluoroethylene oxide adduct (N-polyoxyethylene-N-alkyl-perfluorooctanesulfonic acid amide) was gradually dropped while stirring the calcium silicate fine powder, so that the amount of the surfactant became 400 ml per 100 g of the gyrolite-type calcium silicate.

After the whole amount of the fluorinecontaining surfactant was dropped, the calcium silicate fine powder uniformly impregnated with the surfactant was taken out from the stirrer thereby to prepare porous calcium silicate fine powder carrying the surfactant. The thus prepared fine powder retained a powder state.

PRODUCTION EXAMPLE 2

Porous calcium silicate fine powder carrying a polyether-modified silicone oil (SF 8410, mfd. by Toray Silicone K.K.) was prepared in the same manner as in Production Example 1. The thus obtained fine powder retained a powder state.

PRODUCTION EXAMPLE 3

Porous calcium silicate fine powder carrying a fluorine-containing surfactant was prepared in the same manner as in Production Example 1 except that the fluorine-containing surfactant was dropped into the porous calcium silicate fine powder so that the amount of the surfactant became 30 ml per 100 g of the gyrolite-type calcium silicate. The thus obtained fine powder retained a powder state.

PRODUCTION EXAMPLE 4

Porous calcium silicate fine powder carrying a fluorine-containing surfactant was prepared in the same manner as in Production Example 1 except that the fluorine-containing surfactant was dropped into the porous calcium silicate fine powder so that the amount of the surfactant became 800 ml per 100 g of the gyrolite-type calcium silicate. The thus obtained fine powder showed a paste state, because the amount of the surfactant was larger than the oil absorption of the porous calcium silicate fine powder.

EXAMPLE 10

3 wt. parts of the porous calcium silicate fine powder carrying the fluorine-containing surfactant obtained in Production Example 1, 0.75 wt. part of a vulcanizing agent (50 % paste of 2,5-dimethyl-2,5-di(tertiary-butylperoxy)hexane) and 100 wt. parts of a heat-vulcanization type dimethylsilicone polymer were mixed to knead the porous calcium silicate fine powder in the silicone rubber, and the resultant mixture was subjected to pressing molding at 170° C. for 10 min. thereby to obtain a rubber molding in a flat plate form (20 mm × 60 mm × 2 mm). The rubber molding was further subjected to second vulcanization at 200° C. for 4 hours.

With respect to the thus vulcanized flat plate rubber molding, the antistatic property thereof was examined in the following manner.

Figure 6:
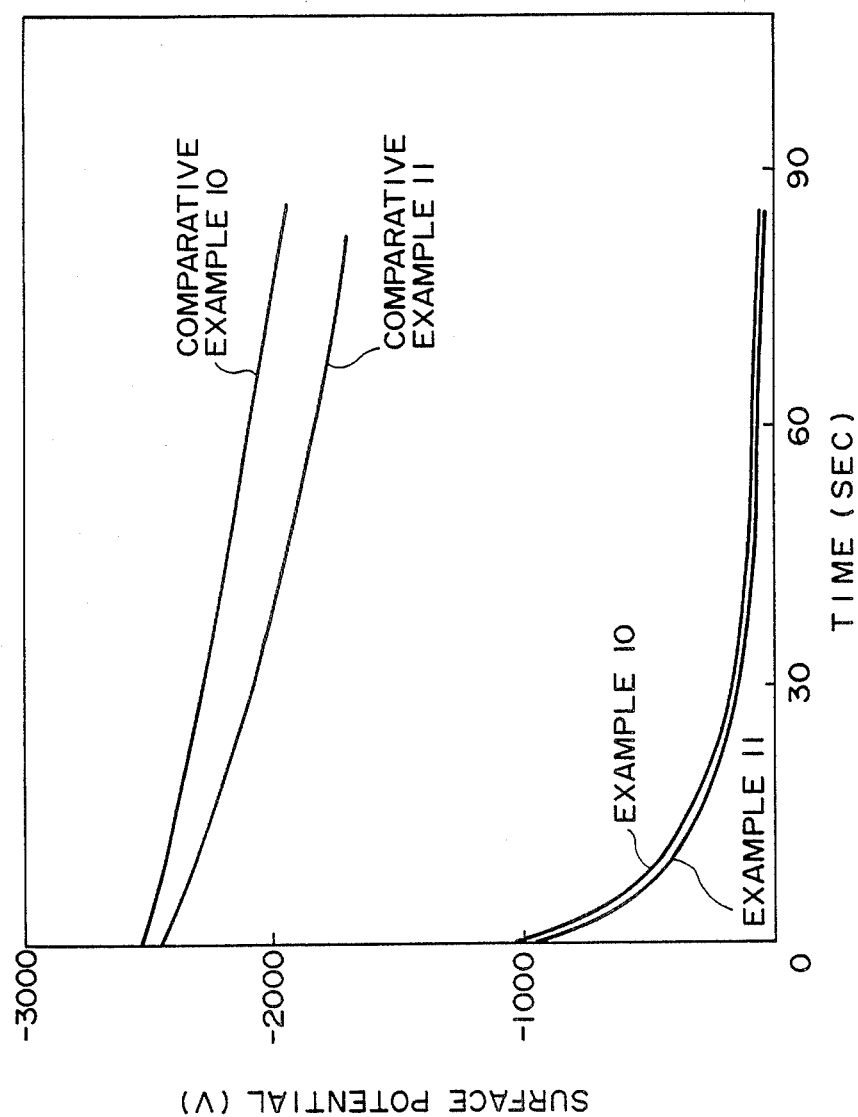
FIG. 6 is a graph showing changes in the surface potential of the rubber moldings in a flat plate form of Examples 10 and 11 and Comparative Examples 10 and 11, with the elapse of time.

A voltage of −5000 V was applied to the flat plate rubber molding by corona discharge for 1 sec, and immediately thereafter the potential change on the surface of the flat rubber plate was measured by means of a surface electrometer by using a sensitive plate probe. The results are shown in FIG. 6 and Table 5 appearing hereinafter.

EXAMPLE 11

A rubber molding in a flat plate form was prepared in the same manner as in Example 10 except that the porous calcium silicate fine powder carrying the polyether-modified silicone oil obtained in Production Example 2 was used instead of the calcium silicate fine powder carrying the fluorine-containing surfactant used in Example 10. The antistatic property of the resultant flat rubber plate was examined in the same manner as in Example 10. The results are shown in FIG. 6 and Table 5 appearing hereinafter.

COMPARATIVE EXAMPLE 10

A rubber molding in a flat plate form was prepared in the same manner as in Example 10 except that calcium silicate fine powder carrying the fluorine-containing surfactant was not used. The antistatic property of the resultant flat rubber plate was examined in the same manner as in Example 10. The results are shown in FIG. 6 and Table 5 appearing hereinafter.

TABLE 5

| | Flat plate rubber molding | | |
|---|---|---|---|
| | Ex. 10 | Ex. 11 | Com. Ex. 10 |
| Initial potential | −1060 V | −1000 V | −2520 V |
| Half-life | 12 sec. | 11 sec. | above 60 sec. |

COMPARATIVE EXAMPLE 11

A rubber molding in a flat plate form was prepared in the same manner as in Example 10 except that the porous calcium silicate fine powder carrying the fluorine-containing surfactant obtained in Production Example 3 was used. The antistatic property of the resultant flat rubber plate was examined in the same manner as in Example 10. The results are shown in FIG. 6. As apparent from FIG. 6, the rubber molding of this instance was inferior to those of Examples 10 and 11 in antistatic property.

COMPARATIVE EXAMPLE 12

A rubber molding in a flat plate form was prepared in the same manner as in Example 10 except that the porous calcium silicate fine powder carrying the fluorine-containing surfactant obtained in Production Example 4 was used. The resultant flat rubber plate was excellent in antistatic property but was inferior to that of Example 10 in hardness, resilience and tensile strength.

Various characteristics of the flat plate rubber moldings of Example 10 and Comparative Examples 10 to 12 are inclusively shown in the following Table 6.

TABLE 6

| | Flat plate rubber molding | | | |
|---|---|---|---|---|
| | Example 10 | Comparative Example 10 | Comparative Example 11 | Comparative Example 12 |
| Hardness (JIS A) | 30 | 30 | 31 | 23 |
| Resilience (%) | 73 | 75 | 74 | 64 |
| Tensile strength (kgf/cm$^2$) | 57 | 57 | 57 | 40 |
| Elongation (%) | 590 | 590 | 570 | 630 |

EXAMPLE 12

A pressure roller for a heat pressure fixing device having an elastic layer comprising the heat-vulcanization-type silicone rubber prepared in Example 10 was prepared in the following manner.

The unvlucanized heat-vulcanization type silicone rubber was wound on a stainless steel core bar with an outside diameter of 10 mm coated with a siloxane-type primer. Then, the resultant core bar was disposed in a metal mold which had preliminarily been heated up to 150° C., and vulcanized at 150° C. under a pressure of 100 Kg/cm$^2$. After the curing, the thus formed pressure roller covered with the silicone rubber was taken out from the metal mold and the surface thereof was ground, thereby to obtain a pressure roller covered with the silicone rubber having an outside diameter of 16 mm.

EXAMPLE 13

A pressure roller for a heat pressure fixing device having an elastic layer comprising the heat-vulcanization type silicone rubber prepared in Example 11 was prepared in the same manner as in Example 12.

COMPARATIVE EXAMPLE 13

A pressure roller for a heat pressure fixing device having an elastic layer comprising the heat-vulcanization type silicone rubber prepared in Comparative Example 10 was prepared in the same manner as in Example 12.

COMPARATIVE EXAMPLE 14

3 wt. parts of molecular sieves containing a polyether-modified silicone oil were kneaded in 100 wt. parts of a heat-vulcanization type silicone rubber together with a vulcanizing agent. Then, a pressure roller for a heat pressure fixing device having an elastic layer comprising the resultant heat-vulcanization type silicone rubber was prepared in the same manner as in Example 12.

The polyether modified silicone oil used herein was SF 8410 (mfd. by Toray Silicone K.K.), and the molecular sieves were "13X" (mfd. by Union Carbide Co.) having an oil absorption of about 20 ml/100g. 50 wt.

parts of the polyether-modified silicone oil was used with respect to 100 wt. parts of the molecular sieves (i.e., about 50 ml of the silicone oil was used per 100 g of the molecular sieves).

COMPARATIVE EXAMPLE 15

A pressure roller for a heat pressure fixing device having an elastic layer comprising the heat-vulcanization type silicone rubber prepared in Comparative Example 11 was prepared in the same manner as in EXample 12.

The pressure rollers obtained in Examples 13 and 14, and Comparative Examples 13, 14 and 15 were respectively disposed in a heat pressure fixing device as shown in FIG. 1, and a fixing test was conducted while sheets of paper were continuously passed through the fixing device. Referring to FIG. 1, the fixing roller 1 used herein was one comprising an aluminum core bar with an outside diameter of 20 mm and a 15 microns-thick tetra-fluoroethylene resin layer covering the core bar.

<Fixing conditions>

Controlled temperature of fixing roller surface: 150° C.

Clamping pressure between fixing roller and pressure roller: 6 kgf

Supplied paper: A-4 size transfer paper (plain paper) on which an unfixed toner image corresponding to a test pattern was formed.

Paper supply speed: 4 sheets/min.

The results are shown in the following Table 7.

TABLE 7

|  | Winding characteristic of transfer paper | Attachment of toner |
|---|---|---|
| Example 13 | No winding was observed after 50,000 sheets | No toner attachment was observer after 50,000 sheets |
| Example 14 | No winding was observed after 50,000 sheets | No toner attachment was observer after 50,000 sheets |
| Comparative Example 13 | Winding occurred at the time of 4,000 sheets | Toner attachment occured at the time of 2,000 sheets |
| Comparative Example 14 | Winding occurred at the time of 10,000 sheets | Toner attachment occured at the time of 7,000 sheets |
| Comparative Example 15 | Winding occurred at the time of 11,000 sheets | Toner attachment occured at the time of 8,000 sheets |

What is claimed is:

1. A fixing device, comprising at least a pair of rollers between which a toner image-supporting material carrying an unfixed toner image is passed under heating and pressure to fix the toner image to the toner image supporting material; wherein at least one of said pair of rollers comprises an elastic roller including an elastic layer which is obtained by thermally molding a mixture comprising at least an organic polymer and porous inorganic fine powder carrying a liquid antistatic agent; said porous inorganic fine powder being dispersed in the organic polymer; said porous inorganic fine powder having an oil absorption of 100 ml/100 g or larger before it carries the liquid antistatic agent.

2. A fixing device according to claim 1, wherein the organic polymer comprises a silicone rubber.

3. A fixing device according to claim 2, wherein the organic polymer comprises an addition reaction-type silicone rubber.

4. A fixing device according to claim 1, wherein the organic polymer comprises ar unvulcanized rubber.

5. A fixing device according to claim 1, wherein the organic polymer comprises an unvulcanized silicone rubber.

6. A fixing device according to claim 1, wherein the antistatic agent comprises a surfactant.

7. A fixing device according to claim 6, wherein the antistatic agent comprises a fluorinecontaining surfactant.

8. A fixing device according to claim 7, wherein the antistatic agent comprises a fluorinecontaining surfactant selected from the group consisting of perfluoroalkylcarboxylic acid ester, perfluoroalkylsulfonic acid amide-type compound, perfluoroalkylpolyoxyethyleneethanol, perfluoroalkylcarboxylic acid salt, perfluoroalkylammr,nium salt, perfluoroalkylbetaine, perfluoroalkylamine oxide, perfluoroalkylethylene oxide adduct, perfluoroalkylphosphoric acid ester, and nondissociative perfluoroalkyl compound.

9. A fixing device according to claim 1, wherein the antistatic agent comprises a polyethermodified silicone oil.

10. A fixing device according to claim 9, wherein the antistatic agent comprises a polyether-modified silicone oil represented by the following formula:

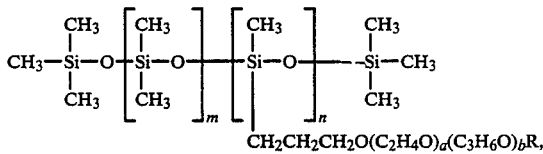

wherein R denotes hydrogen atom or an alkyl group; m denotes zero or a positive integer; n denotes a positive integer; and a and b respectively denote zero or a positive integer while a and b are not simultaneously zero.

11. A fixing device according to claim 1, wherein the antistatic agent comprises an amino-modified silicone oil.

12. A fixing device according to claim 11, wherein the antistatic agent comprises an amino-modified silicone oil represented by the following formula:

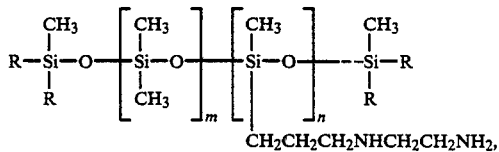

wherein R denotes —$CH_3$ or —$OCH_3$, and m denotes zero or a positive integer, and n denotes a positive integer.

13. A fixing device according to claim 11, wherein the antistatic agent comprises an amino-modified silicone oil, represented by the following formula:

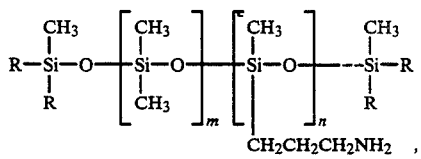

wherein R denotes -CH$_3$ or -OCH$_3$, and m denotes zero or a positive integer, and n denotes a positive integer.

14. A fixing device according to claim 1, wherein the porous inorganic fine powder has an oil absorption of 200-800 ml/100 g.

15. A fixing device according to claim 14, wherein the porous inorganic fine powder has an oil absorption of 300-600 ml/100 g.

16. A fixing device according to claim 1, wherein the porous inorganic fine powder has an average particle size of 1-70 microns.

17. A fixing device according to claim 16, wherein the porous inorganic fine powder has an average particle size of 1-40 microns.

18. A fixing device according to claim 1, wherein the porous inorganic fine powder comprises gyrolite-type calcium silicate powder having an oil absorption of 200-800 ml/100 g.

19. A fixing device according to claim 1, wherein the porous inorganic fine powder comprises spherical porous silica fine powder having an oil absorption of 200-800 ml/100 g.

20. A fixing device according to claim 1, wherein the porous inorganic fine powder comprises Shirasu-ballon powder having an oil absorption of 200-800 ml/100 g.

21. A fixing device according to claim 1, wherein the antistatic agent is carried on the porous inorganic fine powder in an amount of not less than 50 ml and less than the oil absorption of the porous inorganic fine powder, per 100 g of the porous inorganic fine powder.

22. A fixing device according to claim 1, wherein the antistatic agent is carried on the porous inorganic fine powder in an amount of 2/5×V to 4.9/5×V (ml) wherein V denotes the oil absorption of the porous inorganic fine powder (ml/100 g), per 100 g of the porous inorganic fine powder.

23. A fixing device according to claim 1, which comprises an unvulcanized silicone rubber; a fluorinecontaining polysiloxane having in its side chain a polyfluoroalkyl group, and a functional group having a reactivity to the unvulcanized silicone rubber; and porous inorganic fine powder carrying a liquid antistatic agent; said porous inorganic fine powder having an oil absorption of 100 ml/100 g or larger before it carries the liquid antistatic agent.

24. A fixing device according to claim 23, wherein the fluorine-containing polysiloxane is represented by the following formula:

wherein Z$^1$ and Z$^2$ respectively denote a functional group capable of reacting with the unvulcanized silicone rubber, R denotes a substituted or unsubstituted alkyl, alkenyl or aryl group, W denotes a polyfluoroalkyl group, a denotes an integer of 0-200, b denotes an integer of 1-100, and c denotes an integer of 0-50.

25. A fixing device according to claim 24, wherein Z$^1$ and Z$^2$ respectively denote —CH=CH$_2$, —OH or —(CH$_2$)$_4$—OH, W denotes —(CH$_2$)$_d$R$_f$, —O(CH$_2$)$_d$R$_f$, —O(OC$_3$F$_6$)R$_f$, —CF$_2$(OC$_3$F$_6$)OC$_3$F$_7$, or —OCF$_2$(OC$_2$F$_4$)$_e$(OCF$_2$)$_f$OC$_3$F$_7$, wherein d and f respectively denote an integer of 1-20, e denotes an integer of 1-10, and R$_f$ denotes a straight or branched chain polyfluoroalkyl group having 3-21 carbon atoms.

* * * * *

UNITED STATES PATENT AND TRADEMARK OFFICE
CERTIFICATE OF CORRECTION

PATENT NO. : 4,970,559
DATED : November 13, 1990
INVENTOR(S) : TOSHIYUKI MIYABAYASHI It is certified that error appears in the above-identified patent and that said Letters Patent is hereby corrected as shown below:

On the title page:

IN [30] FOREIGN APPLICATION PRIORITY DATA

Insert: --Oct. 17, 1988 [JP]  Japan ........ 63-262514--.

COLUMN 1

Line 40, "fibermaking" should read --fiber-making--.
   Line 59, "contact" should read --contacts--.

COLUMN 2

Line 61, "hightemperature" should read --high-temperature--.

COLUMN 4

Line 5, "thereto" should read --thereto.--.

COLUMN 5

Line 33, "imagesupporting" should read --image-supporting--.
   Line 64, "groupcontaining" should read --group-containing--.

COLUMN 9

Line 65, "Sirasu-balloon" should read --Sirasa-balloon--.

UNITED STATES PATENT AND TRADEMARK OFFICE
CERTIFICATE OF CORRECTION

PATENT NO. : 4,970,559
DATED : November 13, 1990
INVENTOR(S) : TOSHIYUKI MIYABAYASHI It is certified that error appears in the above-identified patent and that said Letters Patent is hereby corrected as shown below:

COLUMN 10

Line 6, "hand," should read --hand, if--.
    Line 20, "500 500 ml/100 g)," should read --500 (500 ml/100 g),--.
    Line 53, "acrylonitrile-butadiene rubber" should read --acrylonitrile-butadiene rubber,--.

COLUMN 12

Line 57, "reactiontype" should read --reaction-type--.
    Line 62, "reactiontype" should read --reaction-type--.

COLUMN 13

Line 1, "a" should read --an--.
    Line 24, "represented" should read --represented by--.

COLUMN 15

Line 54, "care" should read --core--.
    Line 60, "care" should read --core--.

COLUMN 16

Line 41, "mount" should read --amount--.

COLUMN 17

Line 56, "groupcontain-" should read --group-contain- --.

UNITED STATES PATENT AND TRADEMARK OFFICE
CERTIFICATE OF CORRECTION

PATENT NO. : 4,970,559
DATED : November 13, 1990
INVENTOR(S) : TOSHIYUKI MIYABAYASHI It is certified that error appears in the above-identified patent and that said Letters Patent is hereby corrected as shown below:

COLUMN 18

Line 39, "ant" should read --and--.

COLUMN 19

Line 45, "(B 3)." should read --(B-3).--.

COLUMN 20

TABLE 2-continued, "(%)*" should read --(%)-- and "There" should read --Their--.
Line 41, "ar" should read --an--.
Line 56, "bar" (second occurrence) should be deleted.

COLUMN 21

Line 3, "styrenea-" should read --styrene-a- --.
Line 9, "kneadingpulverization" should read --kneading-pulverization--.
Line 38, "(Example 3." should read --Example 3.--.
Line 40, "cf" should read --of--.
Line 50, "an" should read --in--.

COLUMN 22

Line 18, "polyethermodified" should read --polyether-modified--.
Line 26, "groupcontaining" should read --group-containing--.

UNITED STATES PATENT AND TRADEMARK OFFICE
CERTIFICATE OF CORRECTION

PATENT NO. : 4,970,559
DATED : November 13, 1990
INVENTOR(S) : TOSHIYUKI MIYABAYASHI It is certified that error appears in the above-identified patent and that said Letters Patent is hereby corrected as shown below:

COLUMN 22

Line 27, "dryprocess" should read --dry-process--.
    Line 32, "polyethermodified" should read --polyether-modified--.
    Line 44, "plalinum" should read --platinum--.
    Line 66, "plalinum" should read --platinum--.

COLUMN 23

Line 10, "the result" should read --The results--.
    Line 29, "the pressure robber" should read --The pressure rubber--.

COLUMN 24

Line 22, "Nalkyl-" should read --N-alkyl- --.

COLUMN 26

Line 24, "2XC" should read --2Xc--.

COLUMN 27

Line 65, "an" should read --a--.

UNITED STATES PATENT AND TRADEMARK OFFICE
CERTIFICATE OF CORRECTION

PATENT NO. : 4,970,559
DATED : November 13, 1990
INVENTOR(S) : TOSHIYUKI MIYABAYASHI It is certified that error appears in the above-identified patent and that said Letters Patent is hereby corrected as shown below:

COLUMN 28

Line 20, "fluorinecontaining" should read
         --fluorine-containing--.
    Line 28, "fluorinecontaining" should read
         --fluorine-containing--.

COLUMN 31

Line 10, "EXam-" should read --Exam- --.
    Line 68, "ar" should read --an--.

COLUMN 32

Line 7, "fluorinecontaining" should read
         --fluorine-containing--.
    Line 10, "fluorinecontaining" should read
         --fluorine-containing--.
    Line 15, "fluoroalkylammr,nium" should read
         --fluoroalkylammonium--.
    Line 20, "polyethermodified" should read
         --polyether-modified--.

COLUMN 33

Line 37, "Shirasu-ballon" should read --Sirasa-balloon--.

UNITED STATES PATENT AND TRADEMARK OFFICE
CERTIFICATE OF CORRECTION

PATENT NO. : 4,970,559

DATED : November 13, 1990

INVENTOR(S) : TOSHIYUKI MIYABAYASHI

It is certified that error appears in the above-identified patent and that said Letters Patent is hereby corrected as shown below:

COLUMN 34

Line 10, "fluorinecon-" should read --fluorine-con- --.

Signed and Sealed this

Thirteenth Day of October, 1992

Attest:

DOUGLAS B. COMER

Attesting Officer

Acting Commissioner of Patents and Trademarks